United States Patent
Masuda

(10) Patent No.: US 7,956,318 B2
(45) Date of Patent: Jun. 7, 2011

(54) OPTICAL SCANNING DEVICE AND OPTICAL SCANNING METHOD HAVING A LIGHT DEFLECTOR, SEPARATION OPTICAL SYSTEM AND LIGHT BEAM DETECTING DEVICE

(75) Inventor: Koji Masuda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 25 days.

(21) Appl. No.: 11/858,281

(22) Filed: Sep. 20, 2007

(65) Prior Publication Data

US 2008/0084594 A1 Apr. 10, 2008

(30) Foreign Application Priority Data

Sep. 20, 2006 (JP) ................. 2006-254772

(51) Int. Cl.
  *H01J 3/14* (2006.01)
(52) U.S. Cl. ........................ 250/235; 250/216
(58) Field of Classification Search .......... 250/216, 250/234–236; 348/195; 358/474, 514, 483, 358/481; 359/196, 197, 212–221, 223, 226, 359/204, 205, 207; 347/250, 224, 233–235, 347/256, 258–260, 225, 261
See application file for complete search history.

(56) References Cited

U.S. PATENT DOCUMENTS

| | | | |
|---|---|---|---|
| 5,223,703 A * | 6/1993 | Setani | 250/208.1 |
| 5,418,638 A * | 5/1995 | Hirasawa | 359/197 |
| 5,875,051 A | 2/1999 | Suzuki et al. | |
| 6,064,057 A * | 5/2000 | Shimomura et al. | 250/226 |
| 6,069,724 A | 5/2000 | Hayashi et al. | |
| 6,075,638 A | 6/2000 | Masuda et al. | |
| 6,081,386 A | 6/2000 | Hayashi et al. | |
| 6,384,949 B1 | 5/2002 | Suzuki | |
| 6,433,929 B1 * | 8/2002 | Sasaki | 359/388 |
| 6,456,314 B1 | 9/2002 | Masuda | |
| 6,462,879 B2 | 10/2002 | Masuda | |
| 6,496,214 B1 | 12/2002 | Masuda et al. | |
| 6,686,946 B2 | 2/2004 | Masuda et al. | |
| 6,717,606 B2 | 4/2004 | Masuda | |
| 6,724,414 B2 | 4/2004 | Masuda et al. | |
| 6,930,807 B1 * | 8/2005 | Shimomura et al. | 358/505 |
| 7,068,295 B2 | 6/2006 | Masuda | |
| 2005/0045813 A1 * | 3/2005 | Suzuki et al. | 250/234 |
| 2005/0067944 A1 | 3/2005 | Masuda et al. | |
| 2005/0093963 A1 | 5/2005 | Masuda | |
| 2007/0195663 A1 * | 8/2007 | Kadowaki et al. | 369/44.37 |

FOREIGN PATENT DOCUMENTS

| | | |
|---|---|---|
| JP | 7-72388 | 3/1995 |
| JP | 9-325288 | 12/1997 |
| JP | 10-235928 | 9/1998 |
| JP | 2005-37575 | 2/2005 |
| JP | 2005-62597 | 3/2005 |

* cited by examiner

*Primary Examiner* — Georgia Y Epps
*Assistant Examiner* — Pascal M Bui-Pho
(74) *Attorney, Agent, or Firm* — Dickstein Shapiro LLP

(57) ABSTRACT

An optical scanning device includes a light source, a light deflector for deflecting and scanning a light beam from the light source, a scanning imaging optical system for imaging the light beam via the light deflector onto a scanned face, a light beam detecting device for detecting a position of the light beam, a separation optical system provided in the light beam detecting device for separating the light beam into a plurality of separation light beams in a sub-scanning direction, a plurality of light detectors provided in the light beam detecting device to be disposed in different positions in the sub-scanning direction, and a plurality of light receiving sections provided in the light detectors, respectively, at least one light receiving section provided in the light detector being disposed such that the end portion on a side for detecting the separation light beam has a predetermined angle to the end portion of the other light detector.

20 Claims, 19 Drawing Sheets

OPTICAL SCANNING DEVICE AND OPTICAL SCANNING METHOD HAVING A LIGHT DEFLECTOR, SEPARATION OPTICAL SYSTEM AND LIGHT BEAM DETECTING DEVICE

PRIORITY CLAIMS

The present application is based on and claims priority from Japanese Patent Application Number 2006-254772, filed on Sep. 20, 2006, the disclosure of which is hereby incorporated by reference herein its entirety.

BACKGROUND OF THE INVENTION

1. Field of the Invention

The present invention relates to an optical scanning device and an optical scanning method.

2. Description of the Related Art

In a high-resolution image forming apparatus, it is desired that an image writing position by means of optical scanning is controlled to a predetermined position within an effective image forming area in which an image is formed with respect to a main-scanning direction and a sub-scanning direction.

Generally, as to the main-scanning direction, a light detector is arranged on the side of the optical scanning start end of the light beam, and the timing from the detection of the light beam to the writing start is adjusted, so as to start the writing in the main-scanning direction.

Moreover, as to the sub-scanning direction, the position of the paper in which an image is formed is detected, and then the timing is adjusted, so as to start the writing.

In manufacturing, it is necessary to set the writing start position with respect to the timing assumed in the design-time by the adjusting the timing while considering the manufacturing errors of the every parts from the light source for generating the light beam to the scanned face (photoconductor) actually scanned by the light and the assembling errors of each part.

However, even if the timing is adjusted to an ideal state in manufacturing, the displacement of the writing start position is developed with the temporal change after the manufacturing. Moreover, the displacement of the writing start position is developed by the expansion and contraction of the parts caused by an environmental condition, especially, a temperature condition when using. These conditions have a significant impact especially on resin parts. Therefore, if the position of the light beam can be detected, the writing start position can be corrected by using an appropriate correction device. In addition, the method for correcting the writing start position by detecting the position of the light beam can be used for adjusting the timing in the manufacturing.

On the other hand, colorization of an image forming apparatus which conducts optical scanning corresponding to each of the colors (for example, cyan, magenda, yellow, and black) and overlaps each of the colors, so as to form a color image is recently improved. In such an image forming apparatus, if the displacement of the image writing start position of each color is developed, image deterioration, so-called color shift occurs in the overlapped color image. This is a problem.

In this case, if the position of the light beam corresponding to each color can be detected, the writing start position of each color is corrected by using an appropriate correction device, and a favorable color image can be obtained by aligning the writing start position of each of the colors.

A high-speed image forming apparatus is also improved. An optical scanning device for conducting optical scanning by means of a plurality of optical beams is increasingly used.

In this optical scanning device, a multi-beam light source having a plurality of luminous points (including an array light source mounted on one chip) is used as the light source instead of a conventional single beam light source having one luminous point.

In the optical scanning device using the multi-beam light source, image deterioration, so called uneven density is caused especially to the displacement in the sub-scanning direction by the change in the distance (pitches) of the light beams when scanning on the scanned face.

In this case, if the position of each of the light beams can be detected, a good image without having uneven density can be obtained by correcting the distance of the light beams by means of an appropriate correction device.

The technique for correcting the manufacturing errors of the parts or the technique for correcting the scanning line pitches of the multi-beams can contribute to the resource saving and the noise reduction in the high speed operation (speed reduction of a light deflector).

In order to achieve the above requirements, it is important to measure the position of the scanning light beams, and is desired to detect the position of the light beam especially in the sub-scanning direction and the distance of the light beams in the sub-scanning direction.

There is proposed in JP-H07-72388A, a technique (the first technique) for detecting a difference of distance of a plurality of light beams in the sub-scanning direction by means of a plurality of light beam detecting devices disposed in the main-scanning direction such that the end portion on the start side in the main-scanning direction of each of the light beam detecting areas becomes non-parallel each other. However, in this first technique, the plurality of detecting devices is arranged in the main-scanning direction, so the size in the light detectors increases in the main-scanning direction, resulting in the growth in the size of the optical scanning device.

The light detectors are generally arranged outside the effective image area in the main-scanning direction.

Accordingly, in addition to the effective image area width, it is necessary for the light beams of the scanning optical system to reach the light detectors. For this reason, if the size of the light detectors increases in the main-scanning direction, the size of the scanning optical system and also the size of the optical scanning device increase. The increase in the size of the scanning optical system causes increase in the length of the optical path and the high angle of field, and also the expansion in the effective diameter.

There is proposed in JP-H-09-325288A a technique (the second technique), which disposes a light shielding mask tilted at a predetermined angle in a sensor array having a plurality of photo-sensors arranged in the main-scanning direction, and calculates the pitches of the laser beams in the sub-scanning direction.

However, in this second technique, the sensor array in which the plurality of photo-sensors is incorporated has a particular shape. Also, the light shielding mask is required. Accordingly, the sensor array becomes expensive. In addition, photo-sensors are arranged in the main-scanning direction, so the size of the sensor array including a circuit board increases.

There is also proposes in JP-H10-235928A a technique (the third technique), which receives light entered from one side portion vertical to the scanning direction, disposes a plurality of light receiving elements for emitting from the other side portion tilted to the scanning direction, and calculates the difference of the scanning light in the sub-scanning direction. In this third technique, the light receiving elements are disposed in the sub-scanning direction; thereby, the increase in the size of the light receiving elements can be prevented, compared with the first technique and the second technique that the light receiving elements are disposed in the main-scanning direction. However, similar to the second technique, the sensor array in which a plurality of photosensors is incorporated has a specific shape, so the sensor array becomes expensive. In the third technique, the output signals from both of the incident side and the emission side (more particularly, both of the rising signal and the falling signal) are used relative to one light receiving element, but it is not desirable from detecting accuracy view.

More particularly, in a photo-diode, a rising time generally differs from a falling time. In a photo-diode which falls from High level to Low level when light enters (falling signal), the rising time is slower than the falling time at several times. Therefore, it is not desirable to use the rising signal from detecting accuracy view.

There is proposed in JP2005-37575A and JP2005-62597A a technique (the fourth technique), which has a plurality of light receiving faces for detecting laser beams, disposes a laser beam detector that at least one end adjacent to the light receiving faces is arranged at an angle, and detects the position of the laser beam in the sub-scanning direction. In this fourth technique, the detection accuracy is maintained by using the falling signal from the light receiving face vertical to the scanning direction and the falling signal from the light receiving face having an angle. However, similar to the second technique and the third technique, the plurality of light receiving faces integrally mounted has a specific shape, so it becomes expensive.

As described above, in the above technique, there is a problem that the size of the optical scanning device increases caused by a plurality of light detectors arranged in the main-scanning direction for detecting displacement of the light beam in the sub-scanning direction. Also, there is a problem that the size of the optical device increases and the optical scanning device becomes expensive because the light receiving sections have a complicated shape, and the light detector having a specific shape that a plurality of light receiving sections is integrally mounted (such as an expensive light detector and an increased light detector having a circuit board) is used.

For the forgoing reasons, there is a need for an optical scanning device and an optical scanning method for detecting a position of a light beam in the sub-scanning direction by using an inexpensive light detector without increasing the size of the device.

SUMMARY OF THE INVENTION

A first aspect of the present invention involves an optical scanning device includes a light source, a light deflector for deflecting and scanning a light beam from the light source, a scanning imaging optical system for imaging the light beam via the light deflector onto a scanned face, a light beam detecting device for detecting a position of the light beam, a separation optical system provided in the light beam detecting device for separating the light beam into a plurality of separation light beams in a sub-scanning direction, a plurality of light detectors provided in the light beam detecting device to be disposed in different positions in the sub-scanning direction, each of the light detectors detecting the separation light beam, and a plurality of light receiving sections each having an end portion, the light receiving sections provided in the light detectors, respectively, at least one light receiving section provided in the light detector being disposed such that the end portion on a side for detecting the separation light beam has a predetermined angle to the end portion of the other light detector.

A second aspect of the present invention involves an optical scanning method of deflecting and scanning a light beam from a light source, and imaging onto a scanned face, includes the steps of separating the light beam into a plurality of separation light beams in the sub-scanning direction for detecting a position of the light beam, and detecting the separation light beams, respectively, by using a plurality of light detectors that an end portion on a side for detecting the light beam of a light receiving section of at least one light detector is disposed at a predetermined angle to an end portion on a side for detecting the light beam of a light receiving section of the other light detector, and each of the light detectors is disposed in a different position in the sub-scanning direction for detecting the separation light beam.

DETAILED DESCRIPTION OF THE PREFERRED EMBODIMENT

Hereinafter, an embodiment of the present invention will be described with reference to the drawings.

Figure 1:
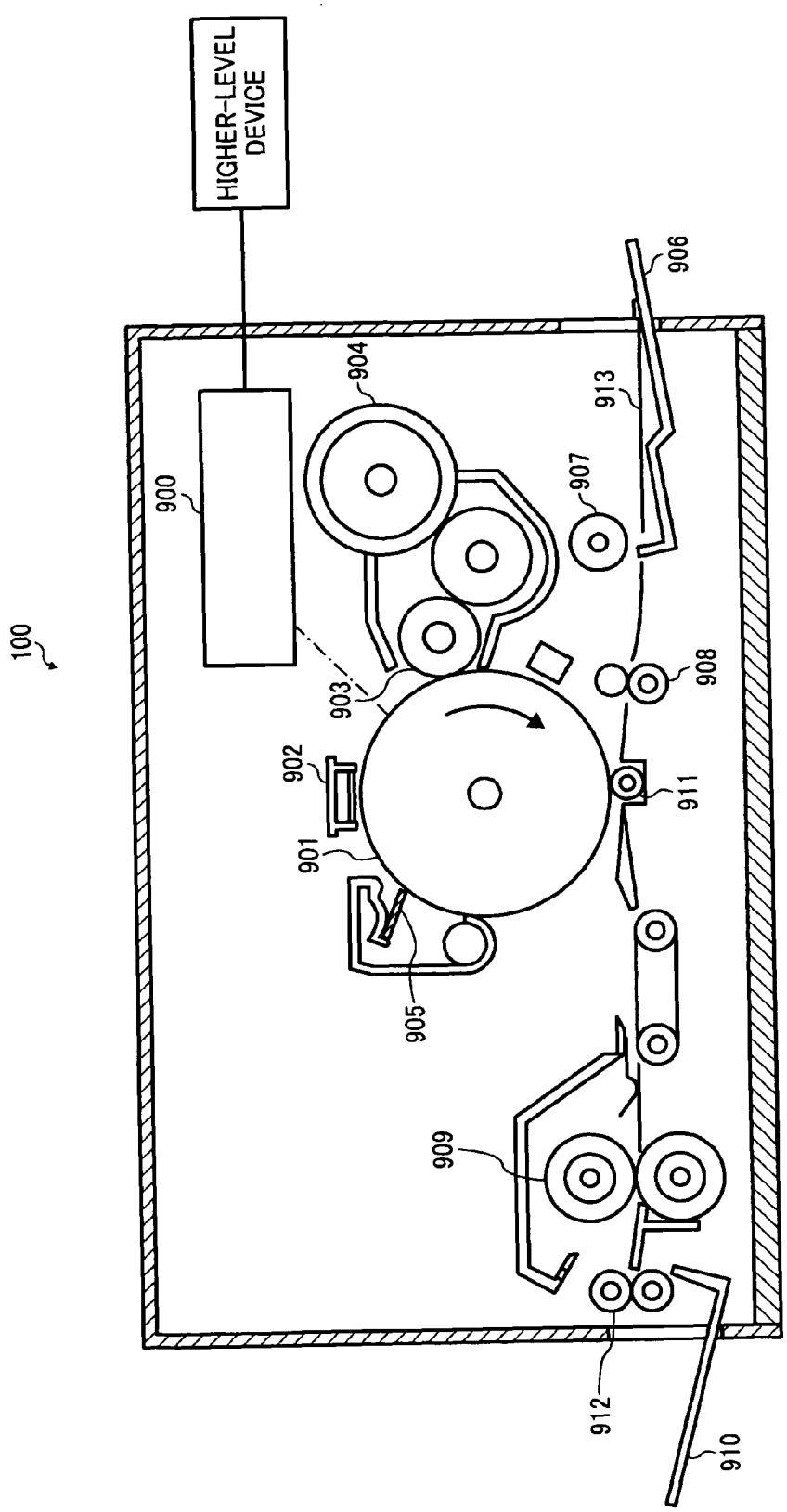
FIG. 1 is a schematic view illustrating a laser printer 100 having an optical scanning device 900 according to an embodiment of the present invention.

FIG. 1 is a schematic view illustrating a laser printer 100 having an optical scanning device 900 according to an embodiment of the present invention. The laser printer 100 includes an optical scanning device 900, a photoconductor drum 901 as a scanning object, a charger 902, a development roller 903, a toner cartridge 904, a cleaning blade 905, a paper feeding tray 906, a paper feeding roller 907, a pair of resist rollers 908, a transfer charger 911, a fixing roller 909, a paper discharging roller 912, and a paper discharging tray 910.

The charger 902, the development roller 903, the transfer charger 911 and the cleaning blade 905 are arranged in order adjacent to the surface of the photoconductor drum 901 along the rotation direction of the photoconductor drum 901.

The photoconductor drum 901 has a photosensitive layer on the surface thereof. The photoconductor drum 901 rotates in the clockwise direction (arrow direction) in FIG. 1.

The charger 902 uniformly charges the surface of the photoconductor drum 901.

The optical scanning device 900 illuminates light modulated according to image information from a higher-level device (for example, a personal computer) to the surface (a scanned face) of the photoconductor drum 901 charged by the charger 902. Thereby, the charge is resolved only in the light illuminated part on the surface of the photoconductor drum 901, and a latent image corresponding to the image information is formed on the surface of the photoconductor drum 901. The latent image formed on the surface of the photoconductor drum 901 moves in the direction of the development roller 903 along the rotation of the photoconductor drum 901.

The longitudinal direction of the photoconductor drum 901 (the direction along the rotation axis) is referred to as "a main-scanning direction" and the rotation direction of the photoconductor drum 901 is referred to as "a sub-scanning direction". An area in which a latent image is formed within a scanning area in the main-scanning direction from a scanning start position to a scanning end position in the photoconductor drum 901 is referred to as "an effective image forming area". In addition, the structure of the optical scanning device 900 will be described below.

The toner cartridge 904 includes toner which is supplied to the development roller 903. The amount of toner stored in the toner cartridge 904 is checked when activating the power and stopping the printing. If the remaining toner is decreased, a message for urging the exchange of the toner cartridge is displayed on a display unit (not shown).

The toner supplied from the toner cartridge 904 is charged and is uniformly adhered onto the surface of the development roller 903 along the rotation. Voltage is applied to the development roller 903, such that an electric filed having a direction is generated in the charged portion (the non-illuminated portion) of the photoconductor drum 901 and also an electric filed having a direction opposite to the direction of the electric field in the charged portion is generated in a non-charged portion (the illuminated portion) of the photoconductor drum 901. By this voltage, the toner adhered onto the surface of the development roller 903 only adheres onto the illuminated portion on the surface of the photoconductor drum 901.

More particularly, the development roller 903 transfers the toner onto the latent image formed on the surface of the photoconductor drum 901; thereby, the image information is visualized. The latent image formed by the toner transferred onto the surface of the photoconductor drum 901 moves in the direction of the transfer charger 911 along the rotation of the photoconductor drum 901.

The paper feeding tray 906 includes recording papers 913 as transferring objects. The paper feeding roller 907 is disposed in the vicinity of the paper feeding tray 906. The paper feeding roller 907 draws the recording paper 913 layer by layer from the paper feeding tray 906, and transfers the paper 913 to the pair of resist rollers 908. The pair of resist rollers 908 is arranged in the vicinity of the transfer charger 911. The pair of resist rollers 908 temporarily retains the recording paper 913 drawn by the paper feeding roller 907, and sends the recording paper 913 between the photoconductor drum 901 and the transfer charger 911 with the rotation of the photoconductor drum 901.

In order to electrically attract the toner on the surface of the photoconductor drum 901 onto the recording paper 913, voltage having a polarity opposite to a polarity of the toner is applied to the transfer charger 911. By this voltage, the latent image on the surface of the photoconductor drum 901 is transferred onto the recording paper 913. The recording paper 913 transferred by the transferring charger 911 is sent to the fixing roller 909.

The fixing roller 909 applies heat and pressure to the recording paper 913; thereby, the toner is fixed onto the recording paper 913. The recording paper 913 onto which the toner is fixed by the fixing roller 909 is sent to the paper discharging tray 910 via the paper discharging roller 912, and is sequentially stacked onto the discharging tray 910.

The cleaning blade 905 eliminates the toner remained on the surface of the photoconductor drum 901 (remaining toner). Moreover, the eliminated remaining toner is reused. The surface of the photoconductor drum 901 from which the remaining toner is eliminated again returns to the position of the charger 902.

Figure 2:
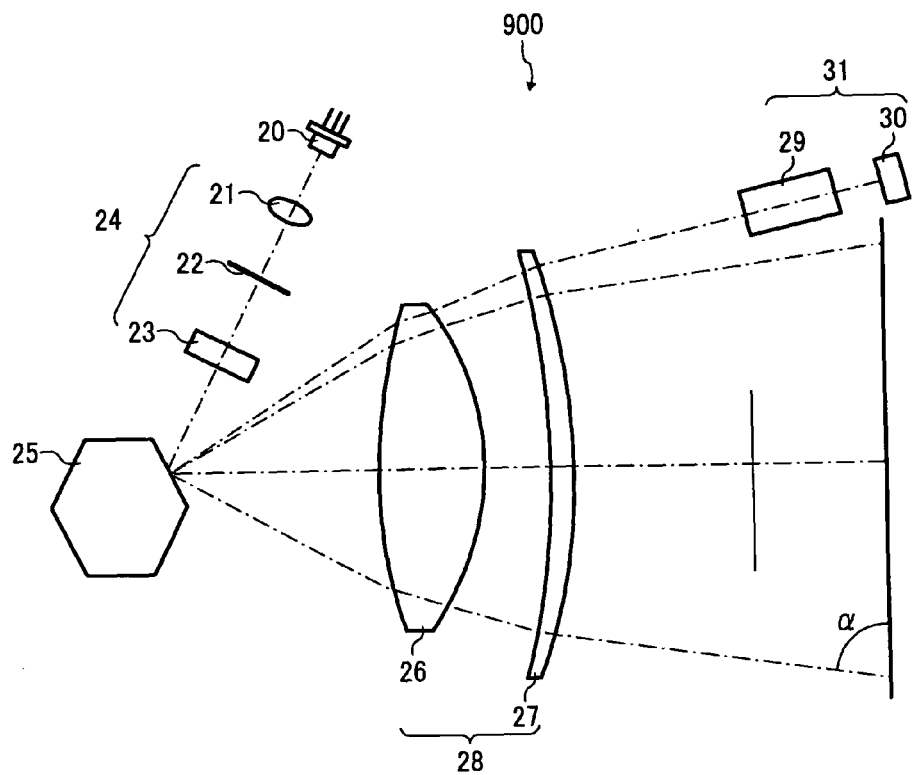
FIG. 2 is a view illustrating a structural example of the optical scanning device 900 according to the embodiment of the present invention.

FIG. 2 is a view illustrating the structural example of the optical scanning device 900 according to the embodiment of the present invention. The optical scanning device 900 according to the embodiment includes a shaping optical system 24 having a light source 20, a coupling lens 21, an aperture stop 22, and a cylindrical lens 23, a light deflector 25, a scanning imaging optical system 28 having two scanning imaging lenses 26, 27, a light beam detecting device 31 having a separation optical system 29 and a light detecting section 30, and a processing unit (not shown in FIG. 2).

The light source 20 generally uses a semiconductor laser as a single beam light source, or uses a semiconductor laser array on which a plurality of adjacent semiconductor lasers is mounted or a surface illuminant laser array (VCSEL array), for example, as a multi-beam light source (i.e., a device for constituting a plurality of light beams).

The coupling lens 21 includes a function for shaping the light emitted from the light source 20 to a near-parallel light. The light emitted from the light source 20 may be shaped into convergent light or divergent light.

After a part of the light beam from the coupling lens 21 is shielded by the aperture stop 22, the light beam is converged in the sub-scanning direction by the cylindrical lens 23, and is imaged in the vicinity of the deflective reflection face of the light deflector 25 in the main-scanning direction as a long line image.

By the rotation of the light deflector 25, the light beam is deflected and scanned, and a light sport is formed on a scanned face a by the two scanning imaging lenses 26, 27.

In addition, a part of the light beam directing to the outside of the effective image forming area of the main-scanning direction enters into the light beam detecting device 31 via the scanning imaging optical system 28. The position of the light beam (for example, the position of the light beam in the sub-scanning direction as described later) is detected in the light beam detecting device 31.

In the light beam detecting device 31, so-called synchronizing detection for detecting the position of the light beam in the main-scanning direction is conducted, so as to adjust timing till the writing start position in the main-scanning direction.

Figure 3:
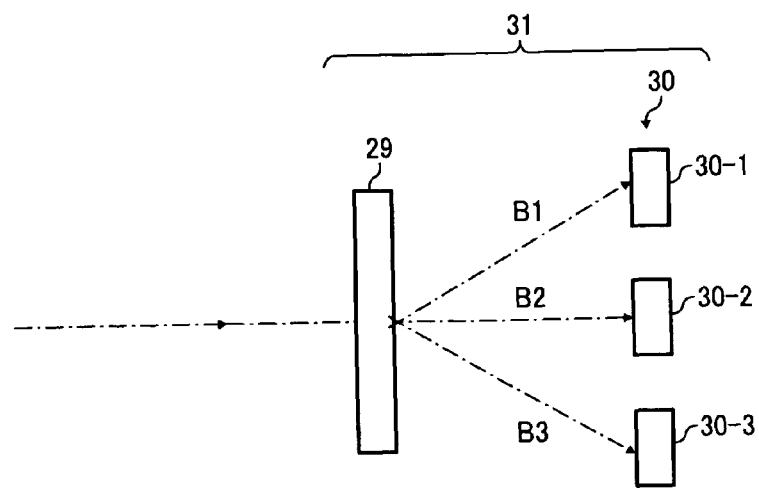
FIG. 3 is a view illustrating a structural example of a light beam detecting device 31 used in the optical scanning device 900 according to the embodiment of the present invention.

FIG. 3 is a view illustrating the structural example of the light beam detecting device 31 used in the optical scanning device 900 according to the embodiment.

As illustrated in FIG. 2, a part of the light beam, which is deflected and scanned by the light deflector 25, and directs to the outside of the effective image forming area via the scanning imaging optical system 28, enters into the separation optical system 29. The entered light beam is divided into a plurality of separation light beams (three separations light beams B1, B2, B3 as illustrated in FIG. 3) in the sub-scanning direction by the separation optical system 29 as illustrated in FIG. 3.

The light detecting section 30 includes three light detectors 30-1, 30-2, 30-3 arranged along the sub-scanning direction. The separation light beams B1, B2, B3 are detected by these three light detectors 30-1, 30-2, 30-3, respectively.

Figure 4:
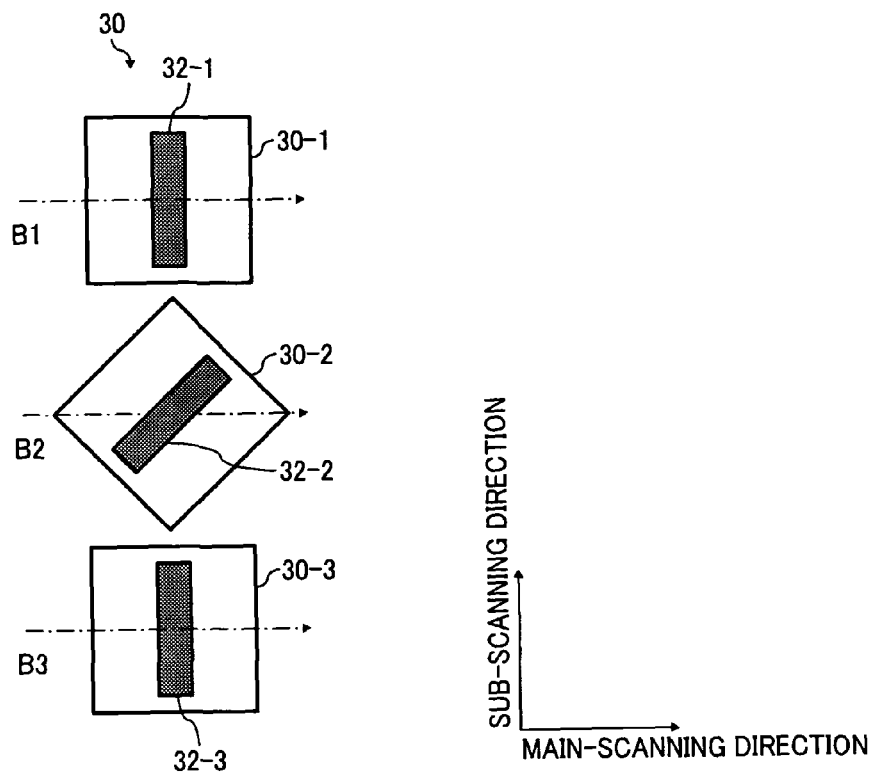
FIG. 4 is a view illustrating an arrangement example of light detectors 30-1, 30-2, 30-3 in a light detecting section 30 of the optical scanning device 900 according to the embodiment of the present invention.

FIG. 4 is a view illustrating the arrangement example of the light detectors 30-1, 30-2, 30-3 in the light detecting section 30 of the optical scanning device 900 according to the embodiment of the present invention.

As illustrated in FIG. 4, the three light detectors 30-1, 30-2, 30-3 are arranged along the sub-scanning direction. The light detectors 30-1, 30-2, 30-3 include light-receiving units 32-1, 32-2, 32-3 for conducting photoelectrical converting with respect to the separation light beams B1, B2, B3, respectively.

In the example illustrated in FIG. 4, the three light detectors 30-1, 30-2, 30-3 are the same light detectors (each having the same shape and the same structure). The light detectors 30-1, 30-3 are arranged in parallel to the sub-scanning direction, but the light detector 30-2 is arranged at a tilt to the sub-scanning direction.

The three separation light beams B1, B2, B3 separated by the separation optical system 29 scan on the light receiving units 32-1, 32-2, 32-3, respectively, as illustrated by the arrows in FIG. 4, and are detected, respectively.

Figure 5:
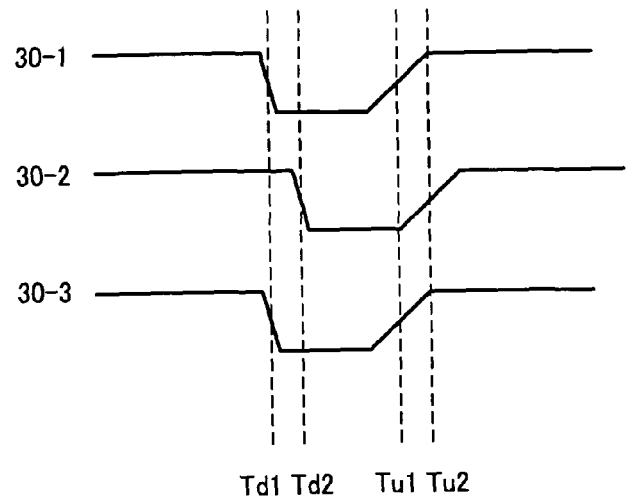
FIG. 5 is a timing chart illustrating output signals of the optical detectors 30-1, 30-2, 30-3 used in the optical scanning device 900 according to the embodiment of the present invention.

FIG. 5 is a timing chart illustrating the output signals of the light detectors 30-1, 30-2, 30-3 used in the optical scanning device 900 according to the embodiment of the present invention.

Namely, FIG. 5 is a timing chart illustrating the output signals of the light detectors 30-1, 30-2, 30-3 when the separation light beams B1, B2, B3 pass the light receiving units 32-1, 32-2, 32-3, respectively.

As illustrated in FIG. 5, the output signal of the light detector 30-1 falls (time Td 1) from High to Low by the separation light beam B1 which has passed the end portion on the scanning start side of the light receiving unit 32-1 (the end portion on the left side of the light receiving unit 32-1 in FIG. 4). After the separation light beam B1 scans over the light receiving unit 31-2, the output signal of the light detector 30-1 rises (time Tu1) from Low to High by the separation light beam B1 which has passed the end portion on the scanning end side of the light receiving unit 32-1 (the end portion on the right side of the light receiving unit 32-1 in FIG. 4).

Each of the end portions of the light receiving unit 32-1 is substantially parallel to the sub-scanning direction, so the times Td1, Tu1 do not vary even if the separation light beam B1 displaces in the sub-scanning direction for scanning.

The same can be said for the light detector 30-3. It is also apparent that Td1=Td3 and Tu1=Tu3.

On the other hand, the light detector 30-2 is arranged at a tilt to the light detectors 30-1, 30-3 substantially parallel to the sub-scanning direction as illustrated in FIG. 4 (i.e., the light receiving section 32-3 is titled). Therefore, the falling timing (time Td2) and the rising timing (time Tu2) of the output signal of the light detector 30-2 vary according to the position of the separation light beam B2 in the sub-scanning direction, which scans on the light receiving section 32-2.

Figure 6:
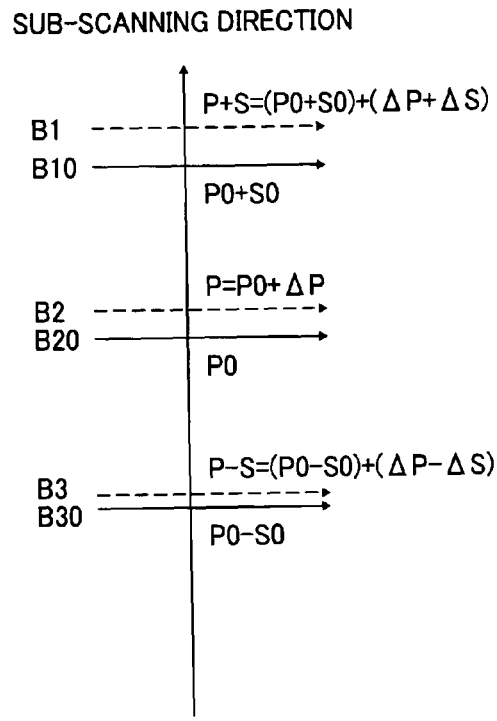
FIG. 6 is a view describing a method for detecting displacement of a light beam, which enters into the light beam detecting device 31 used in the optical scanning device 900, in a sub-scanning direction

FIG. 6 is a view describing a method for detecting displacement of a light beam, which enters into the light beam detecting device 31 used in the optical scanning device 900 according to the embodiment of the present invention, in the sub-scanning direction.

The light beam entered into the separation light system 29 is separated into three separation light beams B10, B20, B30.

In the light detecting face, a distance S0 in the sub-scanning direction between the separation light beams B10, B20 is the same as a distance S0 in the sub-scanning direction between the separation light beams B20, B30.

If the position of the reference separation light beam B20 in the sub-scanning direction is P0, the positions of the separation light beams B10, B20, B30 in the sub-scanning direction in the light detecting face become P0+S0, P0, P0−S0, respectively (solid lines in FIG. 6).

In this case, the distance S0 is a distance in the sub-scanning direction to be separated in the light detecting face depending on an incident position of the light beam entered into the separation optical system 29. The distance S0 is expressed as S0=g (P0) by using a linear function g of 1 for 1.

According to the present embodiment, the position and the tilt of the light detector 30-2 are adjusted, so as to obtain Td1=Td2=Td3 in the initial state.

More particularly, as described above, since the times Td1, Td3 of the output signals of the light detectors 30-1, 30-3 do not change with respect to the positions of the separation light beams B10, B30 in the sub-scanning direction, the time Td2, which varies according to the position of the separation light beam B20 in the sub-scanning direction, is adjusted by adjusting the position and the tilt of the light detector 30-2.

In this case, since the falling times of the light detectors 30-1, 30-2, 30-3 are faster than the rising times of the light detectors 30-1, 30-2, 30-3, the falling time Td is used without using the rising time Tu, in order to improve the detection accuracy. More particularly, the end portions on the scanning start sides of the light receiving units 32-1, 32-2, 32-3 are used as the end portions on the sides for detecting the light beams of the light receiving units 32-1, 32-2, 32-3 of the light detectors 30-1, 30-2, 30-3, respectively.

On the other hand, if the times Td1, Td2 when the separation light beams B10, B20, B30 enter into the previously arranged light detectors 30-1, 30-2, 30-3 become Td1≠Td2, the delay time can be adjusted by providing a delay circuit, so as to obtain Td1=Td2.

By the above procedures, with respect to the position P0 of the reference light beam in the sub-scanning direction, the light beam detecting device 31 can be adjusted, so as to obtain Td1=Td2=Td 3.

It is considered when the position of the light beam in the sub-scanning direction changes into P=P0+ΔP by the factors such as temporal change and environmental change.

In this case, the positions of the separation light beams B1, B2, B3, which are separated by the separation optical system 29, in the sub-scanning direction in the light detecting face become P+S, P, P−S, respectively, as illustrated by the dotted lines. This distance S is a distance in the sub-scanning direction separated on the light detecting face depending on the incident position of the light beam entered into the separation optical system 29, so it is expressed as S=g (P).

In this case, if S=S0+ΔS, the displacement of the separation light beam B1 in the sub-scanning direction becomes ΔS+ΔP relative to the displacement ΔP of the separation light beam B2 in the sub-scanning direction.

More particularly, the ΔS results from the characteristic of the separation optical system 29 (the dependency of the incident position of the entered light beam), and it becomes ΔS=g (P)−g (P0). If the function g is a linear function relative to the incident position of the light beam, ΔS is expressed as ΔS=h (ΔP) by using a function h which is proportional to the incident position distance of the entered light beam (displacement ΔP). Moreover, the simplest example is when the function g does not depend on the incident position of the light beam, and the ΔS becomes ΔS=0.

More particularly, when the light beam generates the displacement ΔP in the sub-scanning direction, the falling timings of the output signals obtained from the light detectors 30-1, 30-3 do not change, so the times Td1, Td3 do not change. On the other hand, since the light receiving section 32-2 of the light detector 30-2 is tilted, the falling timing of the output signal changes to the time Td2' (=Td2+ΔTd2).

Since the amount of change in the time ΔTd2 corresponds to the displacement ΔP of the separation light beam B2 in the sub-scanning direction 1 for 1 with respect to the tilted amount of the light receiving section 32-2, the ΔP can be detected.

In addition, if the light receiving section 32-2 is parallel to the sub-scanning direction and the light-receiving section 32-1 is tilted, the amount of change in the time ΔTd1 corresponds to the displacement ΔS+ΔP of the separation light beam B1 in the sub-scanning direction as described above, so the ΔP can be detected if the relationship between ΔS and ΔP is previously recognized (for example, if the above example is used, ΔS=h (ΔP) or ΔS=0).

As described above, in the optical scanning device 900 according to the above embodiment, the light beam entered into the light beam detecting device 31 (FIG. 3) is separated into the three separation light beams B1, B2, B3 in the sub-scanning direction by the separation optical system 29.

Since one light detector 30-2 disposed in the sub-scanning direction has the arrangement different from the arrangement of the other two light detectors 30-1, 30-2 disposed in the sub-scanning direction, the displacement of the light beam, which enters into the light beam detecting device 31, in the sub-scanning direction can be detected by detecting the positions of the separation light beams B1, B2, B3 in the sub-scanning direction according to the detection method illustrated in FIG. 6 and the falling timings illustrated in FIG. 5.

The time Td1 obtained from the light detector 30-1 does not depend on the position of the scanned light beam to be scanned in the sub-scanning direction. Therefore, by detecting the position in the main-scanning direction, the position in the main-scanning direction can be used as a synchronized detection signal for defining the writing start position in the main-scanning direction.

In the above example, the example that the light beam is separated into the three separation lights B1, B2, B3 in the sub-scanning direction in the light beam detection device 31, and the light detecting section 30 includes the three light detectors (30-1, 30-2, 30-3) is described. However, the light beam can be separated into two separation light beams, and the light detecting section 30 includes two light detectors 34-1, 34-2 as described later.

FIGS. 7A, 7B, 7C, 7D are views each of which illustrates another structural example of the separation optical system 29 in the optical scanning device 900 according to the embodiment of the present invention.

In the separation optical system 29, a diffracting plane can be used as an optical plane for separating an entered light beam into a plurality of separation light beams, without using a general optical face such as a refracting face and a reflection face.

The diffracting face includes an amplitude modulation type for modulating amplitude (transmittance) of a diffracting face and a phase modulation type for modulating a phase of a diffracting face. The phase modulation type is often used for the diffracting face. In addition, the phase modulation type includes a face relief type for controlling a phase by a shape of a face and a refractive index type for controlling a phase by diffractive index distribution of a medium.

On the other hand, the diffracting face includes a transmissive diffracting face for separating a light beam by transmission and a reflective diffracting face for separating a light beam by reflection. The transmissive diffracting face can be made at low costs, compared with the reflective diffracting face which requires a metal layer or the like for reflecting on an optical face. In the layout in the optical scanning device 900, the separation between the entered light beam and a plurality of reflected separation light beams is required by the reflective diffracting face. Therefore, it is preferable to use the transmissive diffracting face.

The separation optical system 29 can be constructed by a single optical element, or can be constructed by a plurality of optical elements.

Figure 7A:
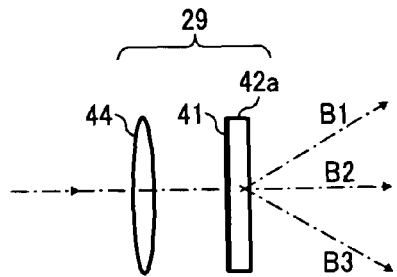
FIG. 7A is a view illustrating one structural example of a separation optical system 29 in the optical scanning device 900 according to the embodiment of the present invention.

FIG. 7A is a view illustrating an example of the separation optical system 29 including two optical elements. In the example shown in FIG. 7A, the separation optical system 29 includes an aspheric lens 44 having an aberration correcting function and a function for changing convergence of a light beam and a diffractive optical element 42a having a transmissive diffracting face 41 and a function for separating a light beam into three separation light beams B1, B2, B3.

Figure 7B:
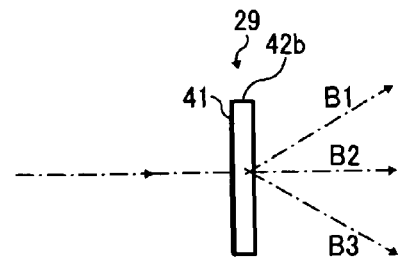
FIG. 7B is a view illustrating another structural example of a separation optical system 29 in the optical scanning device 900 according to the embodiment of the present invention.

In addition, FIG. 7B is a view illustrating an example of the separation optical system 29 including one diffractive optical element 42b. In this example illustrated in FIG. 7B, the diffractive optical element 42b has a transmissive diffracting face 41 for separating a light beam into three separation light beams B1, B2, B3.

Figure 7C:
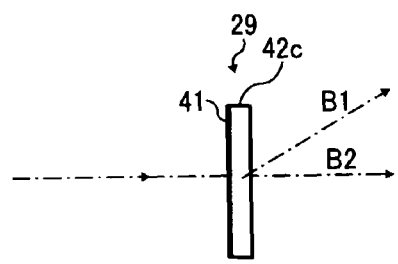
FIG. 7C is a view illustrating another structural example of a separation optical system 29 in the optical scanning device 900 according to the embodiment of the present invention.

FIG. 7C is a view illustrating an example of a separation optical system 29 including one diffractive optical element 42c. In the example illustrated in FIG. 7C, the diffractive optical element 42c has a transmissive diffracting face 41 for separating a light beam into two separation light beams B1, B2. As described above, the separation light beam is not limited to be separated into the three beams as illustrated in FIGS. 7A, 7B. The position of the light beam can be detected as long as the light beam is separated into a plurality of light beams more than one.

Figure 7D:
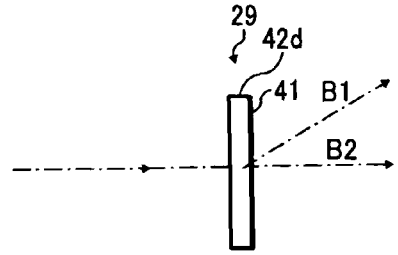
FIG. 7D is a view illustrating another structural example of a separation optical system 29 in the optical scanning device 900 according to the embodiment of the present invention.

FIG. 7D is a view illustrating an example of the separation optical system 29 including one diffractive optical element 42d. In the example illustrated in FIG. 7D, the diffracting optical element 42d has on the back face thereof a transmissive diffracting face 41 for separating a light beam into two separation light beam B1, B2. As described above, the transmissive diffracting face 41 can be used for any optical face of a diffracting optical element. The example that the transmissive diffracting face 41 is used for the last optical face of the separation optical system 29 as illustrated in FIG. 7D is effective because the separation light beams B1-B3 do not pass another optical face, and a different contribution does not generate for each of the separation light beams B1-B3.

It is preferable for the separation optical system 29 to use the diffracting optical element 42a-42d each having the transmissive diffracting face 41 as illustrated in FIGS. 7A-7D.

FIGS. 8A-8D are views each illustrating another structural example of the separation optical system 29 in the optical scanning device 900 according to the embodiment of the present invention and illustrating an example using a diffracting optical element of a phase modulation type having a frequency structure in the sub-scanning direction.

The diffracting optical element having a frequency structure of a frequency $\Lambda$ can separate a light beam in the frequency direction according to a lattice equation. The number of separation light beams B1-B3 can be obtained from the lattice equation. Accordingly, as illustrated in FIG. 3, it is preferable to use the diffracting optical element having a frequency structure in the sub-scanning direction, in order to generate a plurality of separation light beams B1-B3 in the sub-scanning direction.

Figure 8A:
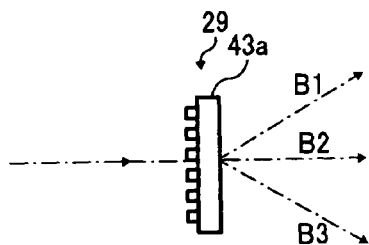
FIG. 8A is a view illustrating another structural example of a separation optical system 29 in the optical scanning device 900 according to the embodiment of the present invention.
Figure 8B:
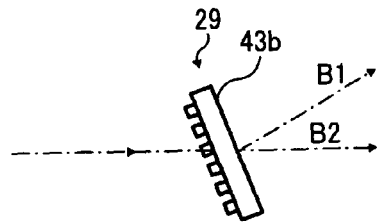
FIG. 8B is a view illustrating another structural example of a separation optical system 29 in the optical scanning device 900 according to the embodiment of the present invention.

FIG. 8A illustrates an example using a diffractive optical element 43a having a surface relief typed diffractive face for separating a vertically entered light beam into three separation light beams B1, B2, B3 as the separation optical system 29. FIG. 8B illustrates an example using a diffracting optical element 43b of a surface relief type for separating an entered light beam into two separation light beams B1, B2 in the sub-scanning direction when a light beam enters at a certain angle.

Figure 8C:
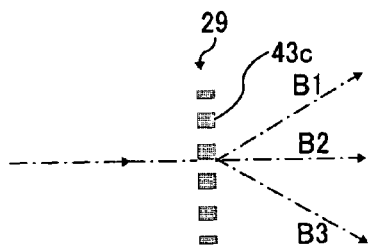
FIG. 8C is a view illustrating another structural example of a separation optical system 29 in the optical scanning device 900 according to the embodiment of the present invention.

FIG. 8C illustrates an example using a diffracting optical element 43c of a refractive index type for separating a vertically entered light beam into three separation light beams in the sub-scanning direction.

Figure 8D:
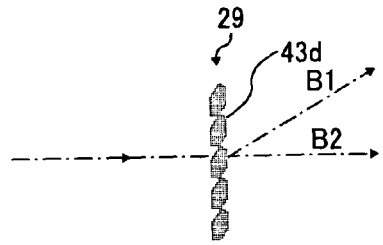
FIG. 8D is a view illustrating another structural example of a separation optical system 29 in the optical scanning device 900 according to the embodiment of the present invention.

FIG. 8D illustrates an example using a diffracting optical element 43d of a refractive index type having an inclined refractive index distribution for separating a vertically entered light beam into two separation light beams B1, B2.

As illustrated in FIGS. 8A-8D, as long as each of the diffracting optical elements 43a-43d has a frequency structure in the sub-scanning direction, the light beam can be separated into the separation light beams B1-B3 in the sub-scanning direction according to the lattice equation.

By the way, in the optical element having a frequency structure, the diffracting face of the phase modulation type only modulates a phase and does not change amplitude. On the other hand, the diffracting face of the amplitude modulation type modulates the amplitude (for example, transmittance), so the transmittance of the light beam decreases.

In the light beam detecting device 31, the entered light beam is separated into a plurality of light beams B1-B3 more than one, so the light volume of each of the separation light beams B1-B3 always becomes ½ or less. Therefore, in order to avoid the decrease in the light volume, it is preferable to use the diffracting face of the phase modulation type as long as the diffracting face has the function for separating the light beam.

In order to separate the light beam, only one transmissive diffracting face 41 can be used or a plurality of optical faces can be combined.

The separation optical system 29 can be constructed by a single optical element having one transmissive diffracting face 41 or by a plurality of optical elements.

However, it is preferable for the separation optical system 29 to include one optical element having one transmissive diffracting face 41, so as to downsize, facilitate the structure, and reduce the costs of the separation optical system 29.

Figure 9:
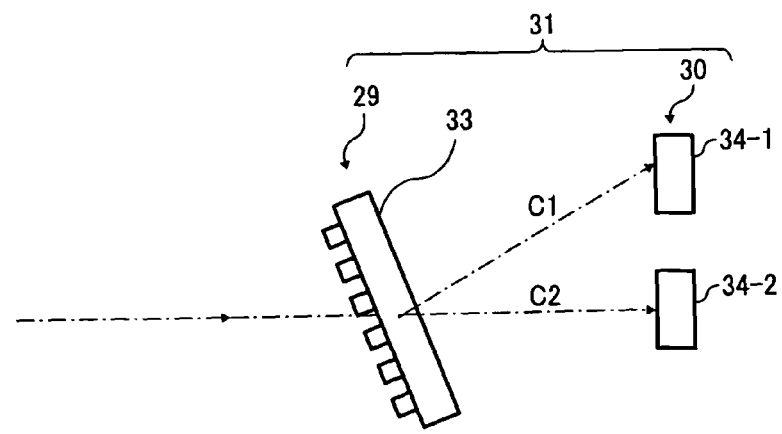
FIG. 9 is a view illustrating another structural example of the light beam detecting device 31 in the optical scanning device 900 according to the embodiment of the present invention.

FIG. 9 is a view illustrating another structural example of the light beam detecting device 31 in the optical scanning device 900 according to the embodiment of the present invention.

In the example of the light beam detecting device 31 illustrated in FIG. 9, a part of the light beam enters into the diffracting optical element 33 of the surface relief type constituting the separation optical system 29, and the entered light beam is separated into two separation light beams C1, C2 in the sub-scanning direction. The separation light beams C1, C2 are detected by the light detectors 34-1, 34-2 constituting the light detecting section 30 arranged in the sub-scanning direction, respectively.

Figure 10:
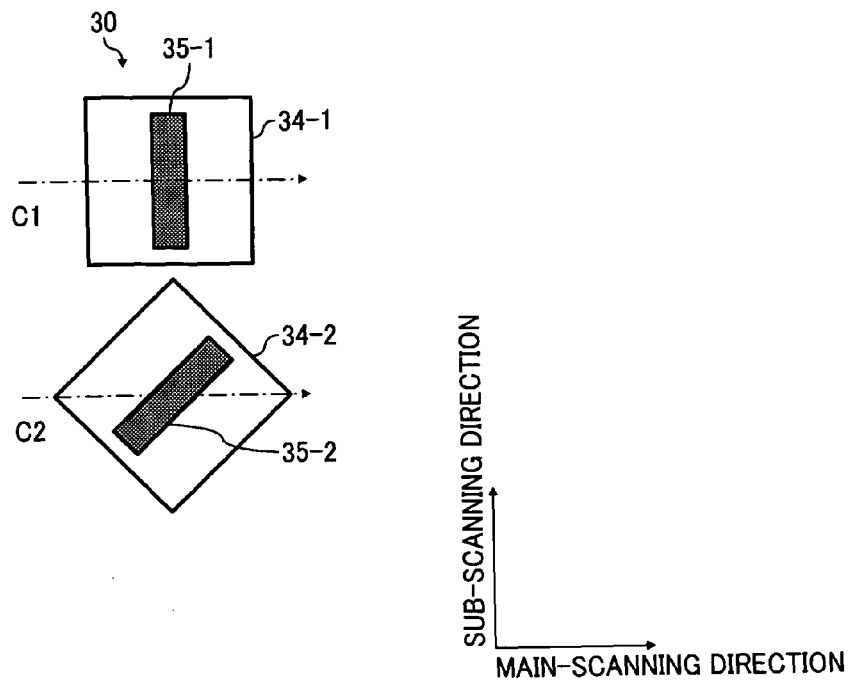
FIG. 10 is a view illustrating a structural example of the light detecting section 30 of the light beam detecting device 31 illustrated in FIG. 9.

FIG. 10 is a view illustrating a structural example of the light detecting section 30 in the light beam detecting device 31 illustrated in FIG. 9. In the example illustrated in FIG. 10, the light detecting section 30 includes light detectors 34-1, 34-2 arranged along the sub-scanning direction. Each of the light detectors 34-1, 34-2 includes a light-receiving section 35-1, 35-2 for conducting photoelectric conversion relative to the separation light beam C1, C2.

In the example illustrated in FIG. 10, the two light detectors 34-1, 34-2 are the same light detectors (having the same shape and the same structure). However, one light detector 34-1 is substantially arranged in parallel to the sub-scanning direction whereas the other light detector 34-2 is tilted to the sub-scanning direction.

In the examples illustrated in FIGS. 9, 10, the light beam to be deflected and to be scanned is separated into the two separation light beams C1, C2 by the separation light system 29 (33), and the separation light beams C1, C2 scan the light receiving units 35-1, 35-2 in the direction illustrated by the arrow in FIG. 10, so as to be detected, respectively.

Figure 11:
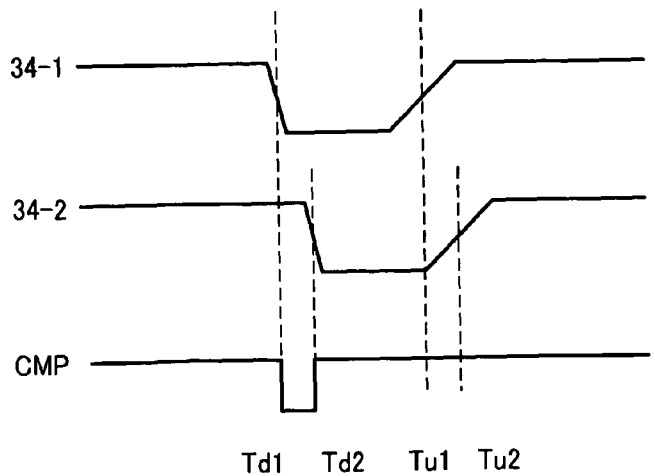
FIG. 11 is a view illustrating a timing chart of the output signals of the light detectors 34-1, 34-2 illustrated in FIG. 9.

FIG. 11 is a view illustrating a timing chart of the output signals of the light detectors 34-1, 34-2. More particularly, FIG. 11 is a timing chart illustrating the output signals of the light detectors 34-1, 34-2 when the separation light beams C1, C2 pass the light receiving sections 35-1, 35-2, respectively. The output signal of the light detector 34-1 falls (time Td1) from High to Low by the separation light beam C1 which has passed through the end portion on the scanning start side of the light receiving section 35-1 (the end portion on the left side of the light receiving section 35-1 in FIG. 10), and rises (time Tu1) from Low to High by the separation light beam C1 which has passed through the end portion on the scanning end side of the light receiving section 35-1 (the end portion on the right side of the light receiving section 35-1 in FIG. 10).

Since the end portion of the light receiving section 35-1, which detects the light beam, is substantially parallel to the sub-scanning direction, the times Td1, Tu1 do not change even if the separation light beam C1 displaces in the sub-scanning direction.

On the other hand, the light detector 34-2 is tilted to the light detector 34-1 and the sub-scanning direction as illustrated in FIG. 10 (i.e., the light receiving section 35-2 is tilted), so the falling timing (Td2) and the rising timing (Tu2) of the output signal of the light detector 34-2 change according to the position of the separation light beam C2 in the sub-scanning direction, which scans on the light receiving section 35-2.

Figure 12:
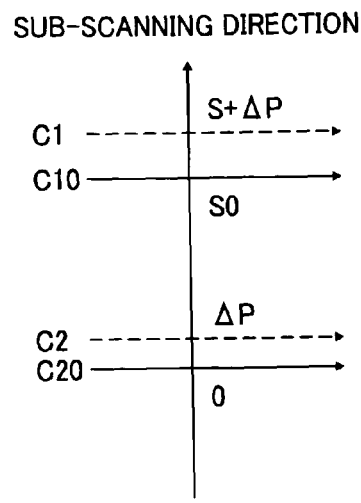
FIG. 12 is a view describing a method for detecting displacement of the position of the light beam, which enters into the light beam detecting device 31 illustrated in FIG. 9, in the sub-scanning direction.

FIG. 12 is a view describing a method for detecting displacement of the position of the light beam, which enters into the light beam detecting device 34, in the sub-scanning direction.

In the two separation light beams C10, C20 separated by the separation optical system 29 in the initial state, the position of the reference separation light beam C20 in the sub-scanning direction is 0. In this case, if a distance S0 is provided between the separation light beams C10, C20 in the sub-scanning direction on the light detecting face, the positions of the separation light beams C10, C20 in the sub-scanning direction become 0, S0, respectively (the solid lines in FIG. 12).

Figure 13:
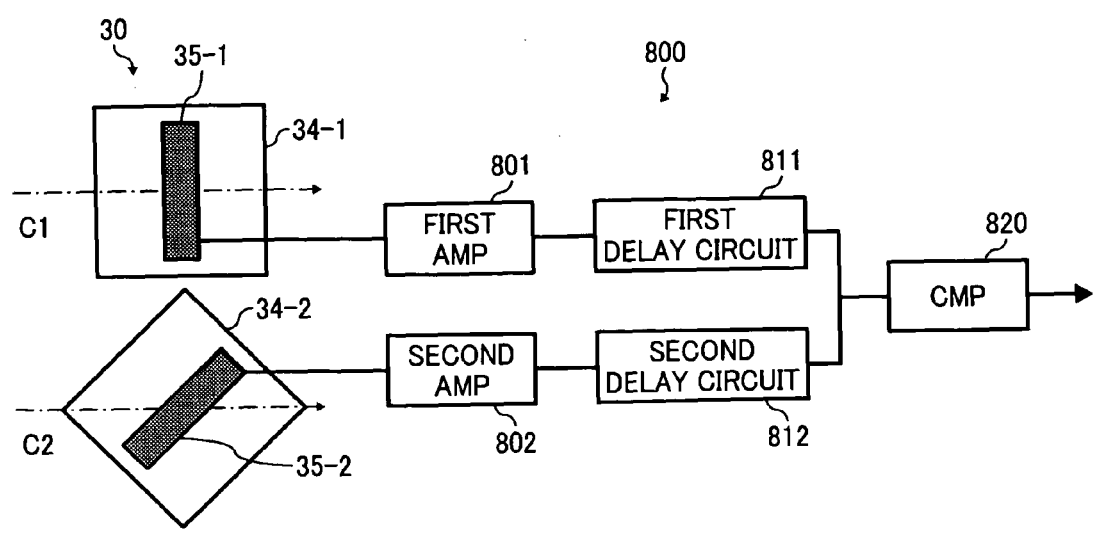
FIG. 13 is a view illustrating a control circuit 800 of the optical scanning device 900 according to the embodiment of the present invention.

FIG. 13 is a view illustrating a control circuit 800 of the optical scanning device 900 according to the embodiment of the present invention.

If the times Td1, Td2 when the separation light beams C10, C20 enter into the previously disposed light detectors 34-1, 34-2, respectively, have a relationship, Td1≠Td2, the delay times can be adjusted by disposing delay circuits, so as to have a relationship, Td=Td2. More particularly, in the initial state, the times are set to be Td1=Td2.

In the control circuit 800 illustrated in FIG. 13, after the output signals from the light detectors 34-1, 34-2 are amplified by first and second AMPs 81, 802, respectively, the delay times are set by a first delay circuit 811 and a second delay circuit 812, respectively, so as to have the relationship, Td1=Td2.

After that, a difference of the times of the falling signals of the input two signals is calculated by a comparator (CMP) 820 as illustrated in the timing chart of FIG. 11. In the initial state, the difference calculated by the comparator is 0.

In this case, the falling time Td of the light detector 34 is faster than the rising time Tu of the light detector 34, so the falling time Td is used in the comparator 820, in order to improve the detection accuracy.

As described above, in the initial state, the light beam detecting device 31 is set to have the relationship, Td1=Td2 relative to the position 0 of the reference light beam in the sub-scanning direction.

Next, it will be described when the position of the light beam in the sub-scanning direction is changed to ΔP by the factors such as the temporal change or the environmental change.

In this case, the separation light beams C1, C2 separated by the separation optical system 29 have a relationship that the positions in the sub-scanning direction on the light detecting face become, ΔP, S+ΔP, respectively as illustrated in the dotted lines in FIG. 12.

More particularly, when the light beam generates the displacement ΔP in the sub-scanning direction, the falling timing of the output signal obtained from the light detector 34-1 does not change, so the time Td1 does not change.

On the other hand, since the light detector 34-2 has the tilted light receiving section 35-2, the falling timing of the output signal changes to the time Td2'. In this case, the calculated time difference ΔT=Td2'−Td2 is a value corresponding to the displacement ΔP in the sub-scanning direction on the light receiving face, and the ΔP can be detected from the output of the comparator 820. In addition, it is necessary to previously figure out the relationship between ΔP and ΔT relative to the light detector 34-2.

In the light beam detecting device 31 illustrated in FIG. 9, the entered light beam is separated into the two separation beams C1, C2, so the maximum light volume of each of the separation light beams C1, C2 is ½ of the maximum light volume of the entered light beam. More particularly, in order to increase the light volume, it is desirable to separate the light beam into the two separation light beams as the examples illustrated in FIGS. 9-13. The increase in the light volume is advantageous for an S/N ratio relative to the light detectors 34-1, 34-2.

Figure 29:
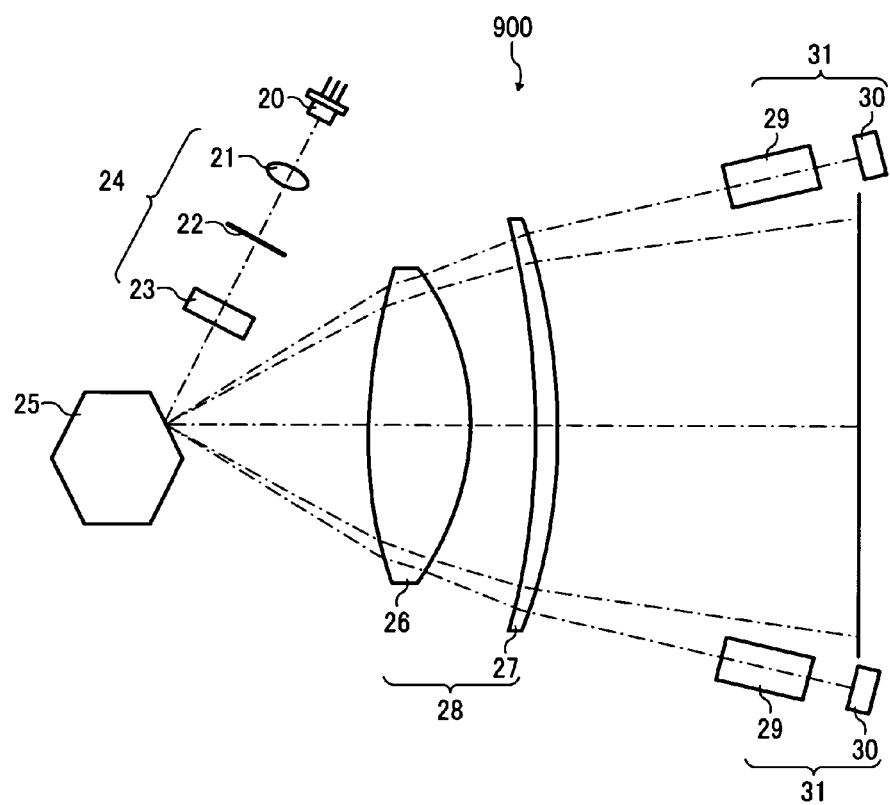
FIG. 29 is a view illustrating an optical scanning device in which a plurality of light beam detecting devices is provided in the main-scanning direction.

In the light beam detecting device 31 illustrated in FIG. 9, a diffracting optical element having a relief shape on the surface 33 for separating the light beam into the two separation light beams C1, C2 in the sub-scanning direction as illustrated in FIG. 29 is used as the separation optical system 29, and the two light detectors 34-1, 34-2 arranged in the sub-scanning direction are used as the light detecting section 30. The positions of the light beams which enter into the light beam detecting device 31, in the sub-scanning direction can be detected in accordance with the detection method illustrated in FIG. 12 by using the two light detectors 34-2, 34-2 each having different arrangement.

Figure 14:
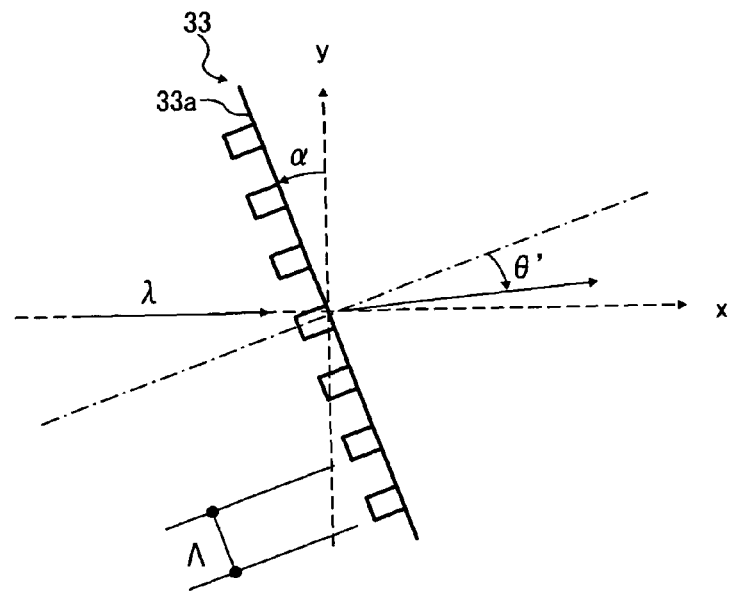
FIG. 14 is a view (a cross-section view in the sub-scanning direction) illustrating a transmissive diffracting face of a diffractive optical element 33 having a relief structure on the surface illustrated in FIG. 9.

FIG. 14 is a view (cross section view in the sub-scanning direction) illustrating the transmissive diffracting face 33a of the diffracting optical element of the surface relief type 33 illustrated in FIG. 9.

It is considered for a light beam entering into the transmissive diffracting face 33a formed on a medium having a refraction index N from an air medium.

As illustrated in FIG. 14, the direction of the light beam entering into the transmissive diffracting face 33a is x-axis and the direction orthogonal to that direction is y-axis.

In this case, an inclination from the y-axis of the transmissive diffracting face 33a is α ($\geq 0$), an output angle of m-order diffracted light is θ' ($>0$), a wavelength of the entering light beam is λ, a frequency of the frequency structure of the transmissive diffracting face 33a is Λ, and a diffraction order is m, $\sin \alpha + m\lambda/\Lambda = N \sin \theta'$ is established from the lattice equation.

If only two light beams generate (transmits and diffracts) by the transmissive diffracting face 33a, the diffracted order m only obtains 0 and $-1$. Therefore, by a condition which does not obtain m=+1, $\sin \alpha + \lambda/\Lambda > N$ is obtained. Accordingly, $\lambda/\Lambda > N - \sin \alpha$ is established.

Moreover, by a condition which does not obtain m=$-2$, $-N > \sin \alpha - 2\lambda/\Lambda$ is obtained. Accordingly, $\lambda/\Lambda > (N + \sin \alpha)/2$ is established.

On the other hand, from the layout required for the present embodiment (i.e., the light detecting section 30 is disposed behind the separation optical system 29), if a condition that the $-1^{st}$ order diffracted light exists in the first phenomenon, $-(90°-\alpha) < \theta' < 0$, is added, $-N \cos \alpha - N \sin(90°-\alpha) < \sin \alpha - \lambda/\Lambda < 0$ is obtained. Accordingly, $\sin \alpha < \lambda/\Lambda < (\sin \alpha + N \cos \alpha)$ is established.

If the smallest functions in the three variable numbers A, B, C are defined as min {A, B, C}, i.e., min{A, B, C}=A ... A$\leq$B and A$\leq$C, it is preferable for A to satisfy the following equation (equation 1).

$$\lambda/(\sin \alpha + N \cos \alpha) < \Lambda < \min\{\lambda/(N - \sin \alpha), 2\lambda/(N + \sin \alpha), \lambda/\sin \alpha\}$$ (equation 1).

For example, if α=0°, the frequency Λ which satisfies the above equation does not exist.

As another example, when N=1.5, α=30°, for example, the right side of the above equation 1 becomes min{λ, λ, 2λ}=λ, so the frequency Λ becomes a value which satisfies 0.556λ<Λ<λ.

As another example, when N=1.5, α=60°, for example, the right side of the above equation 1 becomes min{1.577λ, 0.845λ, 1.155λ}=0.845λ, so the frequency λ becomes a value which satisfies 0.619λ<Λ<0.845λ.

As another example, when N=2.3, α=30°, for example, the right side of the above equation 1 becomes min{0.556λ, 0.714λ, 2λ}=0.556λ, so the frequency λ becomes a value which satisfies 0.401λ<Λ<0.556λ.

As a light beam used for the image forming apparatus, it is general to use a light beam having a wavelength from λ=0.655 μm to 0.785 μm. In addition, a light beam having a wavelength from λ=0.405 μm to 0.655 μm may be used.

It is preferable for the frequency Λ of the frequency structure of the transmissive diffracting face 33a to satisfy the above equation 1. In this case, it is apparent from FIG. 14 that the inclination α is equal to an angle between the light beam λ entering into the light beam detecting device 31 and the normal line of the transmissive diffracting face 33a.

Figure 15:
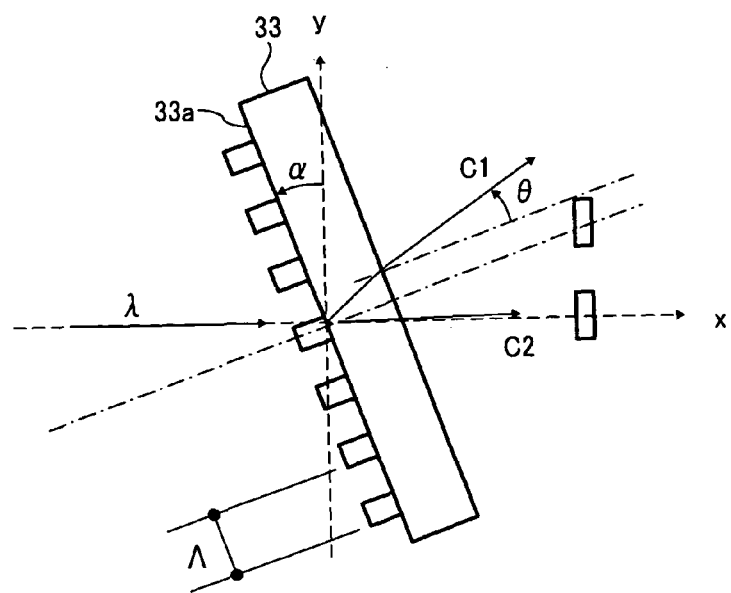
FIG. 15 is a view illustrating the diffractive optical element 33.

FIG. 15 is a view illustrating the diffracting optical element 33. When an incident angle of $1^{st}$ order diffracted light (separation light beam C1) entering into the plane opposite to the transmissive diffracting face 33a is θ' (FIG. 14), an output angle of the $-1^{st}$ order diffracted light transmitting from the diffracting optical element 33 is θ, and a diffracted order is m, $\sin \alpha + m\lambda/\Lambda = N \sin \theta' = \sin \theta$ is established from the lattice equation and the Snell's equation in plane.

Similar to the above, if only two separation light beams generate (transmit and diffract) by the diffracting optical element 33, the diffracted order m only obtains 0 and $-1$. Therefore, $\sin \alpha + \lambda/\Lambda > 1$ is established by a condition which does not obtain m=+1. Accordingly, $\lambda/\Lambda > 1 - \sin \alpha$ is established.

In addition, $-1 > \sin \alpha - 2\lambda/\Lambda$ is established by a condition which does not obtain m=$-2$. Accordingly, $\lambda/\Lambda > (1 + \sin \alpha)/2$ is established.

On the other hand, from the layout required for the optical scanning device 900 of the embodiment of the present invention (i.e., the light detecting section 30 is disposed behind the separation light system 29), if a condition that the $1^{st}$ order diffracted light exists in the first phenomenon, $-(90°-\alpha) < \theta < 0$, is added, $-\cos \alpha = -\sin(90°-\alpha) < \sin \alpha - \lambda/\Lambda < 0$ is established. Accordingly, $\sin \alpha < \lambda/\Lambda < (\sin \alpha + \cos \alpha)$ is established.

Therefore, it is preferable for the frequency Λ to satisfy the following equation (the equation 2).

$$\lambda/(\sin \alpha + \cos \alpha) < \Lambda < \min\{\lambda/(1 - \sin \alpha), 2\lambda/(1 + \sin \alpha), \lambda/\sin \alpha\}$$ (equation 2).

As is clear from the above equation 2, the refractive index is not affected.

For example, when α=30°, 0.732λ<Λ<1.333λ, and the frequency Λ to be satisfied exists.

The frequency Λ satisfying the equation 1 is a condition having two separation light beams which penetrate and diffract by the transmissive diffracting face 33a. The frequency Λ satisfying the equation 2 is a condition having two separation light beams which penetrate by the diffracting optical element 33 having a plane opposite to the transmissive diffracting face 33a. They are not equal.

For example, the $-2^{nd}$-order diffracted light penetrated and diffracted by the transmissive diffracting face 33a does not satisfy the equation 1, but the light is totally reflected by the flat plane and does not penetrate from the diffracting optical element 33. Therefore, there is a condition which satisfies the equation 2.

In addition, the $-1^{st}$ diffracted light penetrated and diffracted by the transmissive diffracting face 33a has a condition which satisfies the equation 1, but does not satisfy the equation 2 because the light is totally reflected by the flat plane and does not penetrate from the diffracting optical element 33.

In the practical use, an element that the transmissive diffracting face 33a only includes one face does not exist, so the condition of the equation 2 is required. However, in this condition, the light which does not penetrate from the diffracting optical element 33 such as the above $-2^{nd}$-order diffracting light is included, so the light volume loss is increased.

Therefore, it is desirable to have a condition which satisfies the equation 1, i.e., generates only two separation light beams by the transmissive diffracting face 33a, and satisfies the equation 2. More particularly, it is desirable to have a condition that the two separation light beams penetrate the diffracting optical element 33. For example, it is more desirable to have a condition $0.732\lambda < \Lambda < \lambda$ rather than a condition $0.556\lambda < \Lambda < \lambda$ which satisfies the equation 1 and a condition $0.732\lambda < \Lambda < 1.333\lambda$ which satisfies the equation 2 when $N=1.5$, $\alpha=30°$.

In the above example, when the wavelength $\lambda$ of the light beam used in the image forming apparatus is about $\lambda=0.655$ μm, it is preferable to use a diffracting optical element having a frequency, $0.479$ μm $<\Lambda<0.655$ μm. Moreover, when the wavelength $\lambda$ is about $\lambda=0.785$ μm, it is preferable to use a diffracting optical element having a frequency, $0.575$ μm $<\Lambda<0.785$ μm.

It is also preferable for the diffracting optical element 33 having a plane opposite to the transmissive diffracting face 33a to satisfy the equation 2. It is more preferable for the diffracting optical element 33 having a plane opposite to the transmissive diffracting face 33a to satisfy the equation 1 and the equation 2.

Figure 16:
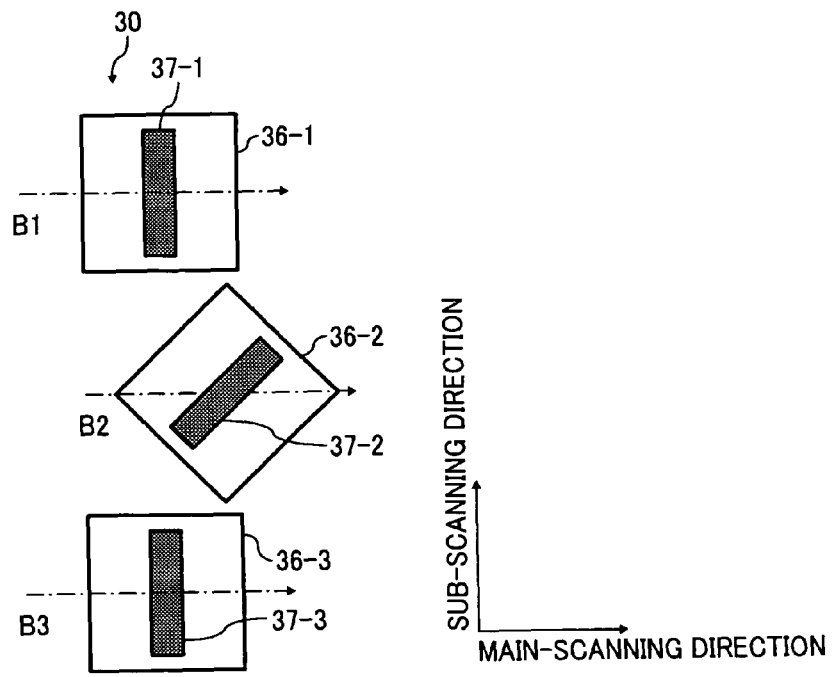
FIG. 16 is a view illustrating an arrangement example of the light detectors in the light detecting section 30 of the optical scanning device 900 according to the embodiment of the present invention.
Figure 17:
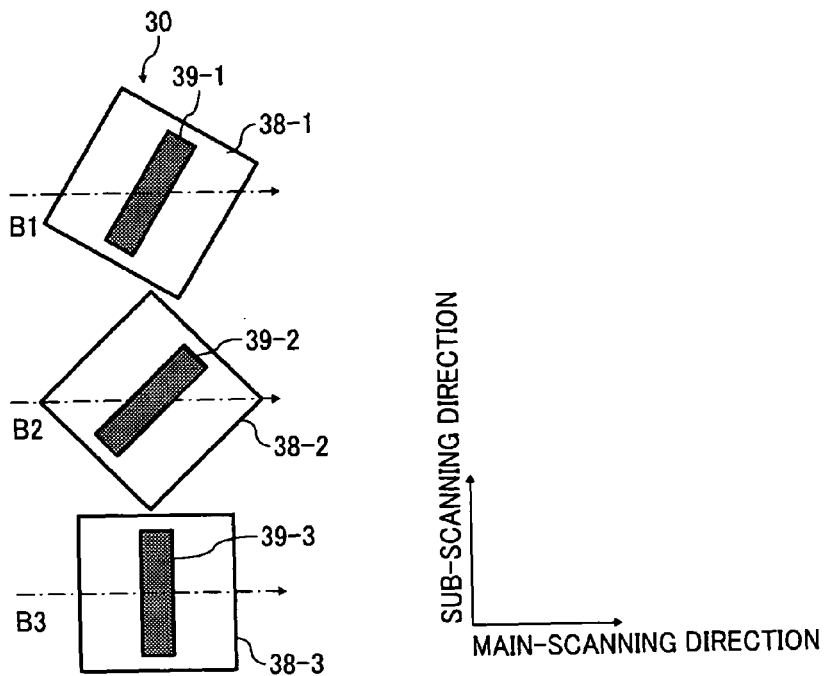
FIG. 17 is a view illustrating an arrangement example of the light detectors in the light detecting section 30 of the optical scanning device 900 according to the embodiment of the present invention.

FIGS. 16, 17 are views each illustrating an arrangement example of light detectors in the light detecting section 30 in the optical scanning device 900 according to the embodiment of the present invention.

In the example illustrated in FIG. 16, three light detectors 36-1, 36-2, 36-3 are arranged in the sub-scanning direction. The light detectors 36-1, 36-2, 36-3 have light receiving sections 37-1, 37-2, 37-3, respectively, for conducting photoelectric conversion to a light beam.

The top and bottom light detectors 36-1, 36-3 are arranged in parallel to the sub-scanning direction and are arranged in the same positions in the main-scanning direction. The middle light detector 36-2 displaces to the other light detectors 36-1, 36-3 in the main-scanning direction and is arranged at a tilt to the sub-scanning direction.

As described above, the light detectors 36-1, 36-3 can be arranged to displace in the main-scanning direction if they are within an effective diameter of the separation optical system 29 disposed in front of the light detecting section 30.

Thereby, the falling timing of the output signal obtained from the light detector 36-2 delays from the timings of the other light detectors 36-1, 36-3, so the delay circuit can be omitted.

As a method for detecting the position of the light beam in the sub-scanning direction, there is known a method for capturing change in the output signal (time) from the light detector by the position in the sub-scanning direction of the light beam scanning on the light receiving section with respect to the light beam scanning in the main-scanning direction.

For this reason, it is necessary to have at least one light detector 36-2 having the light receiving section 37-2 that the end portion on the scanning start side of the light receiving section 37-2 is inclined to the sub-scanning direction.

Moreover, as illustrated in FIG. 17, if a light detector 38-1 including a light receiving section 39-1 having an inclination in the sub-scanning direction and a light detector 38-2 including a light-receiving section 39-2 having an inclination different from the inclination of the light receiving section 39-1 in the sub-scanning direction are used, the positions in the sub-scanning direction can be detected according to the output signals obtained from the two light detectors 38-1, 38-2.

More particularly, as illustrated in FIGS. 16, 17, each of the light detectors 36-1-36-3 and 38-1-38-3 has the same shape. At least one of the light detectors 36-2, 38-1, 38-2 is arranged at a tilt.

On the other hand, in order to quantify the change, it is necessary to have the reference light detector 36-1, 36-3, 38-2 that the output signal (time) by the position of the light beam in the sub-scanning direction do not change.

For this reason, as illustrated in FIGS. 16, 17, it is necessary to have at least one light detector 36-1, 36-3, 38-3 having the light receiving section 37-1, 37-3, 39-3 that the end portion on the scanning start side of the light receiving section is parallel to the sub-scanning direction.

Therefore, in the present embodiment, it is necessary to have at least two light detectors 30-1-30-3, 34-1-34-3, 36-1-36-3, 38-1-38-3 having arrangement different from each other, so as to obtain the output signal which changes according to the position in the sub-scanning direction and the output signal which does not change according to the position in the sub-scanning direction.

As described above, the light receiving section 32-1, 32-3, 35-1, 35-3, 37-1, 37-3, 39-3 that the end portion on the scanning start side is parallel to the sub-scanning direction can be used as the light detector that the output signal (time) according to the position of the light beam in the sub-scanning direction do not change.

In addition, the light detector 30-1-30-3, 34-1-34-3, 36-1-36-3, 38-1-38-3 having the above arrangement can be used as the light detector for detecting synchronization for defining the writing start position in the main-scanning direction.

Since the light receiving section 32-2, 35-2, 36-2, 39-1, 39-2, 41-2 of at least one light detector 30-2, 34-2, 36-2, 38-1, 38-2, 40-2 is arranged at an angle with respect to the light receiving section 32-1, 32-3, 35-1, 37-1, 37-3, 39-3, 41-3 of another light detector 30-1, 30-3, 34-1, 36-1, 36-3, 38-3, 40-3, the position of the light beam in the sub-scanning direction can be detected.

More particularly, by arranging the end portion on the side for detecting light beam of the light receiving section of at least one light detector of a plurality of light detectors (i.e., for example, the end portion on the scanning start side of the light receiving section) at a predetermined angle relative to the end portion on the side for detecting the light beam of the light receiving section of another light detector (i.e., the end portion on the scanning start side of the light receiving section), the position of the light beam in the sub-scanning direction can be obtained.

Specifically, as illustrated in FIGS. 16, 17, by arranging the same light detectors 36-1-36-3, 37-1-37-3 with a different layout, the output signals more than one can be obtained. The output signals more than one can be obtained by arranging the light detectors 40-1, 40-3 and the light detector 40-2 different from the light detectors 40-1, 40-3 as illustrated in FIG. 18.

Figure 18:
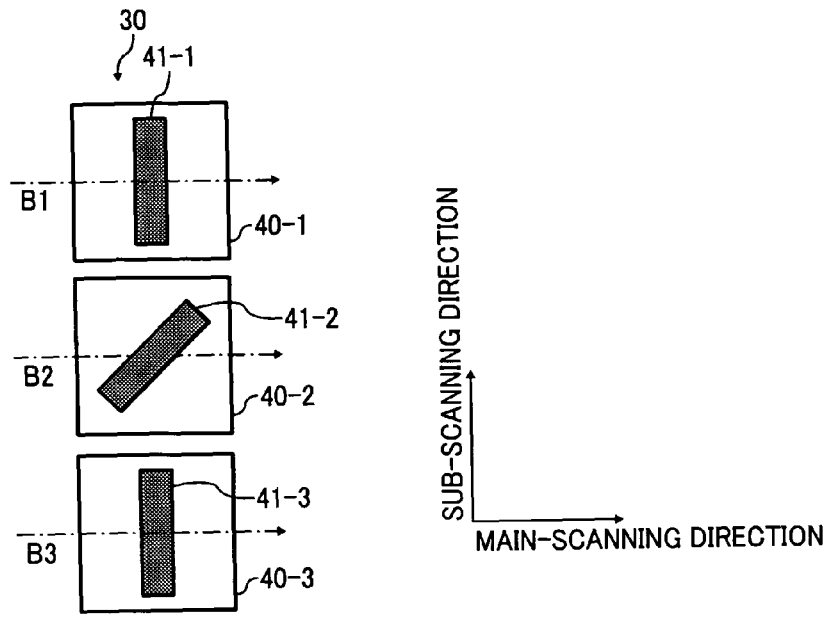
FIG. 18 is a view illustrating another example of the light detectors in the light detecting section 30 of the optical scanning device 900 according to the embodiment of the present invention.
Figure 19:
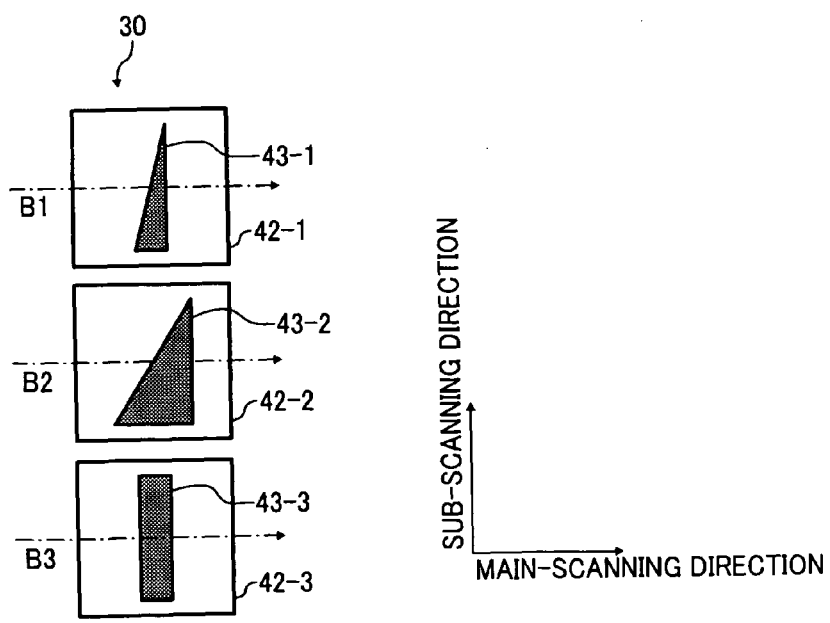
FIG. 19 is a view illustrating another example of the light detectors in the light detecting section 30 of the optical scanning device 900 according to the embodiment of the present invention.

Furthermore, in the example illustrated in FIG. 18, each of the light receiving sections 41-1-41-3 are the same, but the light detectors 40-1, 40-3 are different from the light detector 40-2. In addition, in the example illustrated in FIG. 19, the light detectors 42-1-42-3 are the same, but the shapes of the light receiving sections 43-1-43-3 are different from each other.

However, since the characteristics of the light detectors 36-1-36-3, 38-1-38-3 are the same, it is preferable to change the inclination of the light detector by using the same light detectors 36-1-36-3, 38-1-38-3 as the examples illustrated in FIGS. 16, 17 in terms of the detection accuracy and the structure of the control circuit 800.

As described in the present embodiment, it is preferable for the light detector that the end portion on the side for detecting the light beam is arranged in parallel to the sub-scanning direction (for example, the light detector 34-1 that the end portion on the scanning start side of the light receiving section 35-1 is arranged in parallel to the sub-scanning direction as illustrated in FIG. 13) to be used for detecting the separation light beam (C1) which is diffracted and is not the 0-order transmission.

The diffracted light beam which is not the 0-order transmitted light has a diffraction angle according to the lattice equation. Therefore, when the wavelength λ of the entering light beam changes, the diffraction angle changes. The wavelength changes by a temperature. The change in the wavelength randomly generates by a phenomenon of wavelength jump when a semiconductor laser is used. Therefore, even if the position of the entering light beam in the sub-scanning direction does not change, the position changes by the change in the wavelength, resulting in the miss-detection. More particularly, when the light beam is separated in the sub-scanning direction by the diffraction, it is preferable for the diffracted separation light beam to use the light receiving section arranged in parallel to the sub-scanning direction, such that the output signal from the light detector does not change to the change in the diffraction angle according to the change in the wavelength.

In order to obtain the output signal which changes and the output signals which does not change according to the position in the sub-scanning direction, it is necessary to include the light detecting section 30 having at least two light detectors each different arrangement. For example, as illustrated in FIG. 13, it is possible to detect the position of the light beam in the sub-scanning direction by means of the two light detectors 34-1, 34-2. In the example illustrated in FIG. 10, by using the two light detectors 34-1, 34-2, the two separation light beams C1, C2 can be obtained. Accordingly, compared with the three separation light beams, the light volume can be secured and also the light beam detecting device 31 can be downsized, while reducing the costs.

Figure 32:
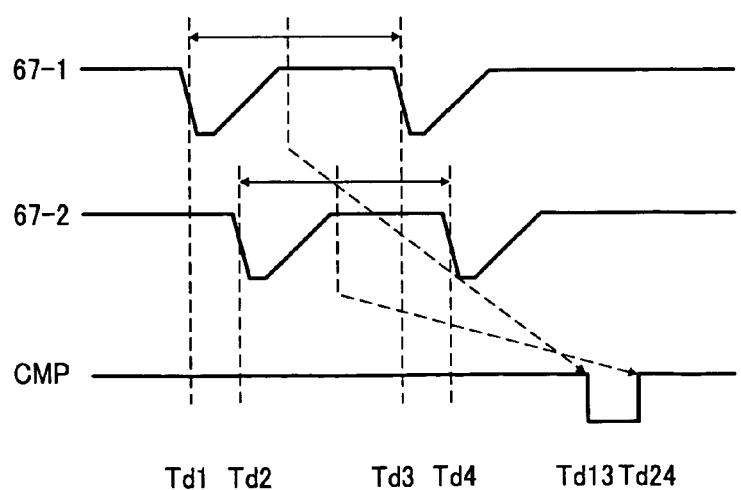
FIG. 32 is a view illustrating an example of light detectors each having a light receiving section divided into two.
Figure 33:
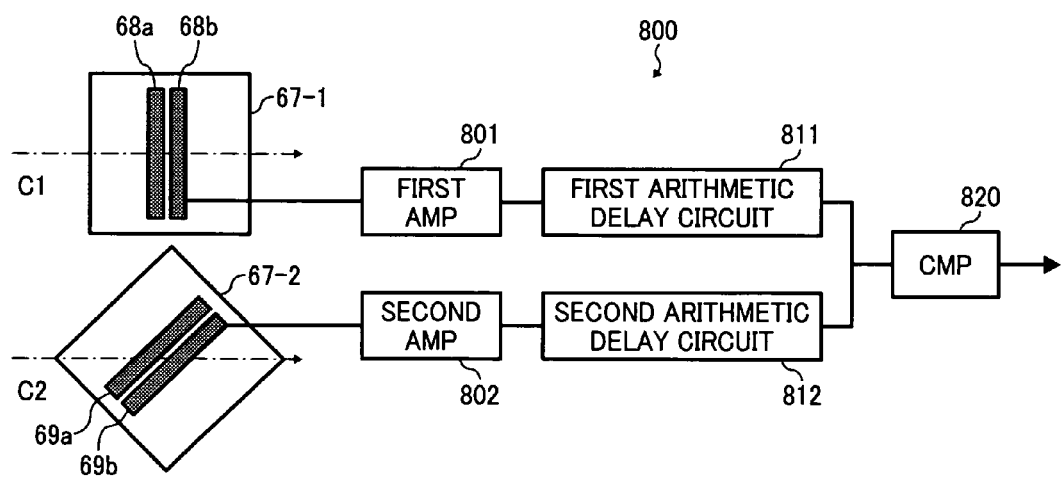
FIG. 33 is a view illustrating an example of light detectors each having a light receiving section divided into two.

FIG. 33 shows a deformation example of the example illustrated in FIG. 13. A light detector 67-1 includes divided light receiving sections 68a, 68b. A light detector 67-2 also includes divided light receiving sections 69a, 69b. Each of the light detectors 67-1, 67-2 is generally refereed to as a two-divided photo-diode. Since the light receiving sections 68a, 68b, 69a, 69b can conduct highly accurate detection compared with the light receiving section 32-1 as illustrated in FIG. 4, such light detectors 67-1, 67-2 can be used according to need. FIG. 32 illustrates a timing chart when the separation light beams C1, C2 pass the light detectors 67-1, 67-2, respectively.

Referring to FIGS. 32, 33, continuing two signals are obtained by the neighboring light receiving sections 68a, 68b as the output signals obtained from the light detector 67-1. When the falling times are Td1, Td3, the time Td 13 regarding a certain delay time corresponding to the central time can be obtained from the light detector 67-1. For example, by outputting the falling time that the influence by the intensity and the size of the light beams passing through the light receiving sections 68a, 68b is concerned as the average value, the influence can be controlled, and the highly accurate detection can be performed. Similarly, since time Td24 can be obtained from the light detector 67-2, the difference ΔTd corresponds to the change in the position of the light beam, which passes the light detector 67-2, in the sub-scanning direction.

Figure 20:
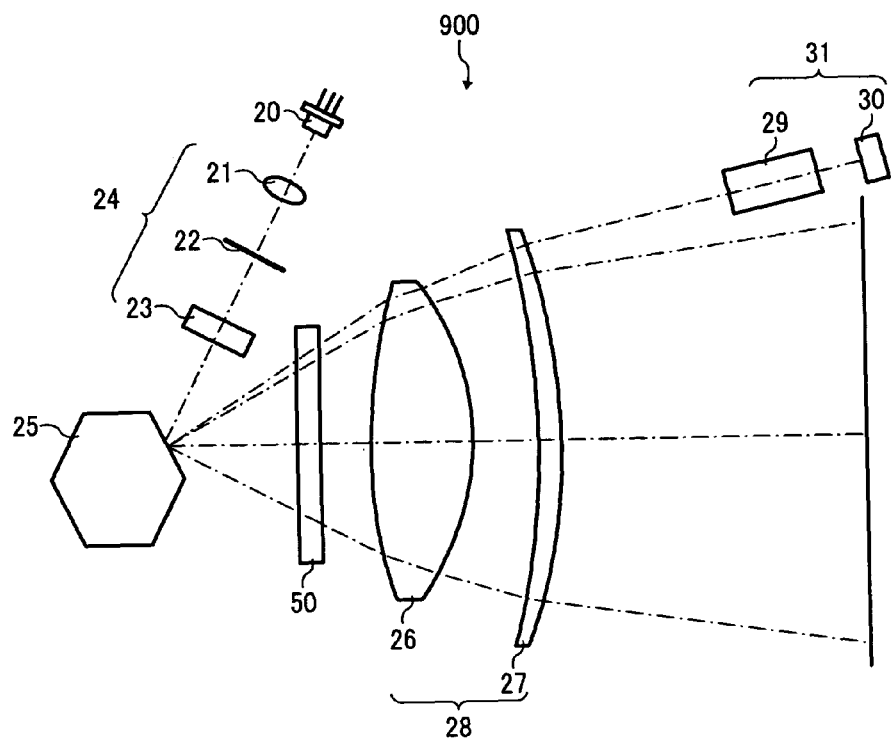
FIG. 20 is a view illustrating another example of the optical scanning device 900 according to the embodiment of the present invention.

FIG. 20 is a view illustrating another example of the optical scanning device 900 according to the embodiment of the present invention. FIG. 20 illustrates an example of the optical scanning device 900 having a position correcting device 50 for correcting a position of a light beam. In addition, in FIG. 20, the same reference numbers are used for the structures used in FIG. 2.

Referring to FIG. 20, the position correcting device 50 is disposed between the light deflector 25 and the scanning imaging optical system 28. The position correcting device 50 includes a function for correcting the position of the light beam, which is led to the effective image forming area, in the sub-scanning direction, based on the position of the light beam, which is detected by the light beam detecting device 31, in the sub-scanning direction.

Moreover, the arrangement position of the position correcting device 50 is not limited to the position illustrated in FIG. 20. The position correcting device 50 can be arranged in any position between the light source 20 and the scanned face a.

Figure 21:
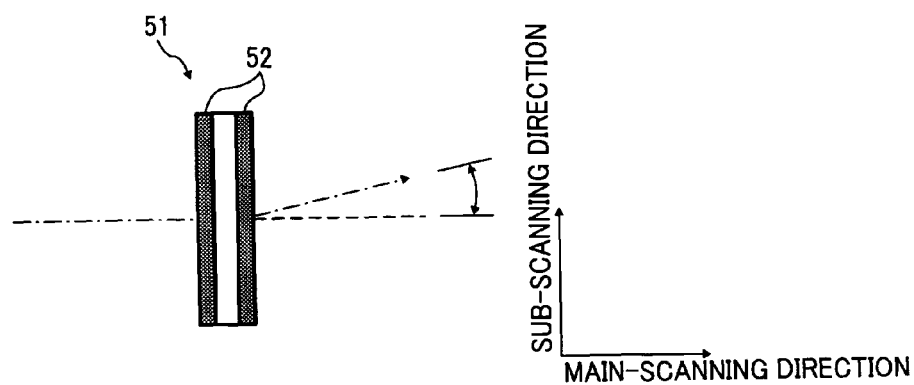
FIG. 21 is a view illustrating a liquid crystal deflection element 51 as a specific example of a position correcting device 50.

FIG. 21 is a view illustrating a liquid crystal deflecting element 51 as a specific example of the position correcting device 50. The liquid crystal deflecting element 51 is an element for deflecting a light beam by optical effects of liquid crystal. The liquid crystal deflecting element 51 can deflect an entered light beam in the sub-scanning direction.

Figure 22:
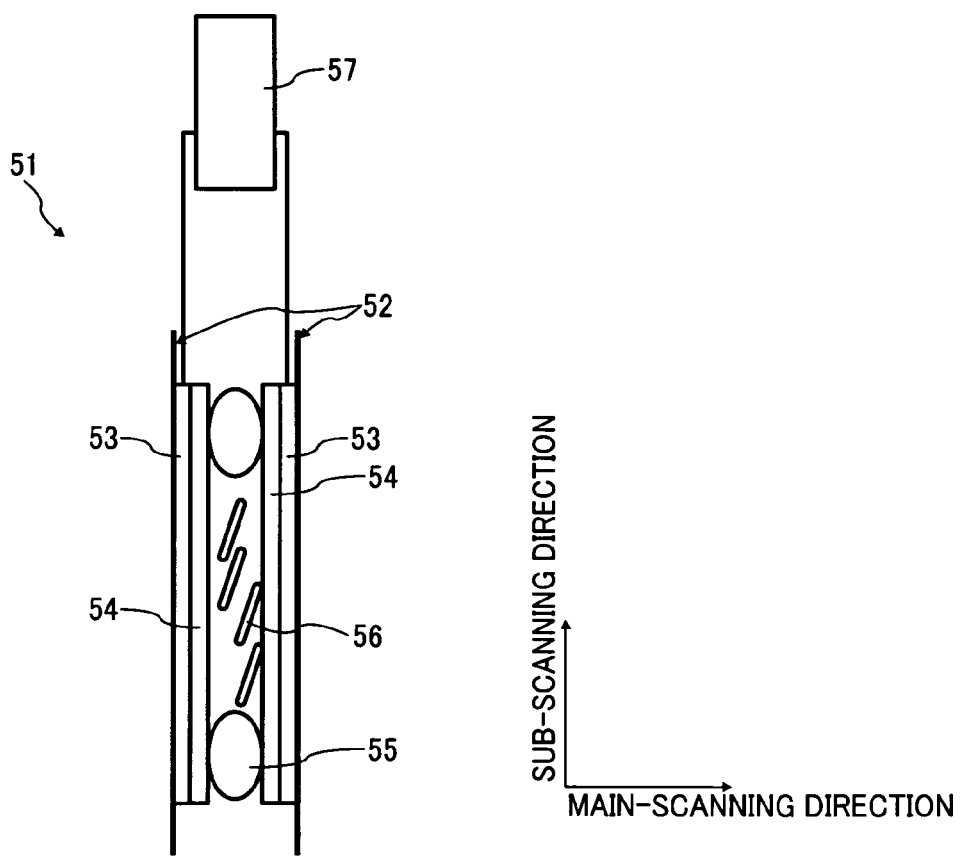
FIG. 22 is a view illustrating a structure and an operation of the liquid crystal deflection element 51.

FIG. 22 is a view describing the structures and the operations of the liquid crystal deflecting element 51. Referring to FIG. 22, the liquid crystal deflecting element 51 includes a pair of transparent plates 52 disposed to face each other in parallel, a pair of transparent electric poles 53 integrally disposed in the inner faces of the transparent plates, respectively, a pair of oriented films 54 disposed in the inner faces of the transparent electric poles 53, respectively, a pair of spacers 55 for maintaining a predetermined space between the oriented films 54, and a liquid crystal layer 56 filled in the space formed by the oriented films 54 and the spacers 55. Voltage is applied to the liquid crystal deflecting element 51 from a driving circuit 57.

In the examples illustrated in FIGS. 20-22, the light beam can be corrected to a consumptive position in the sub-scanning direction by controlling the voltage to be applied to the liquid crystal deflecting element 51 from the driving circuit based on the position of the light beam detected by the light beam detecting device 31 in the sub-scanning direction.

As described above, in the optical scanning device 900 according to the embodiment of the present invention illustrated in the examples in FIGS. 20-22, the light beam can be corrected in a desired position by controlling the position correcting device 50 (for example, the liquid crystal deflecting element 51 illustrated in FIG. 22) based on the position of the light beam detected by the light detecting section 30 in the sub-scanning direction.

Figure 23:
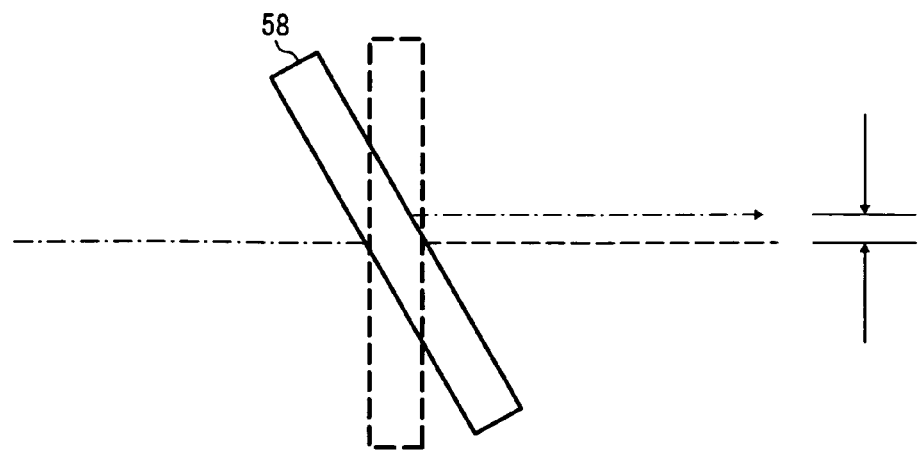
FIG. 23 is a view illustrating another example of the position correcting device 50 of the optical scanning device 900 according to the embodiment of the present invention.
Figure 24:
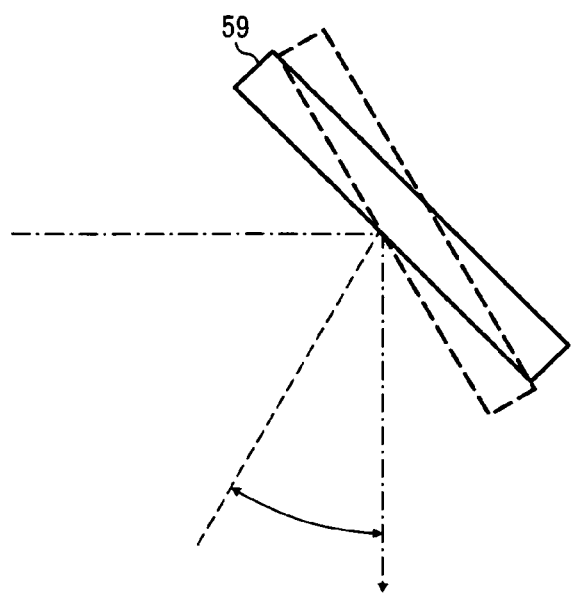
FIG. 24 is a view illustrating another example of the position correcting device 50 of the optical scanning device 900 according to the embodiment of the present invention.

FIGS. 23, 24 are views each illustrating another example of the position correcting device 50 in the optical scanning device 900 according to the embodiment of the present invention.

FIG. 23 is a view illustrating an example of shift of a light beam by rotation of a glass flat plate 58. Referring to FIG. 23, the entered light beam can shift in parallel according to the rotation angle of the glass flat plate 58. The glass flat plate 58 rotates at a predetermined angle by controlling a glass flat plate rotation device (not shown) based on the position of the light beam detected by the light beam detecting device 31 in the sub-scanning direction. Thereby, the light beam can be corrected to a desired position in the sub-scanning direction.

FIG. 24 is a view illustrating an example of light beam deflection by rotation of a mirror 59. The entered light beam can be deflected according to the rotation angle of the mirror 59. More particularly, the mirror 59 rotates at a predetermined angle by controlling a mirror rotation device (not shown) based on the position of the light beam detected by the light beam detecting device 31 in the sub-scanning direction. Thereby, the light beam can be corrected in a desired position in the sub-scanning direction.

As described above, the optical members such as the liquid crystal deflecting element 51 illustrated in FIG. 22, the glass flat plate 58 illustrated in FIG. 23, and the mirror 59 illustrated in FIG. 24 can be used in the position correcting device 50. In the optical members, the position of the light beam can be corrected by controlling the positional changes as illustrated in FIGS. 23, 24 and the physical change as the liquid crystal layer illustrated in FIG. 22 by means of respective control devices.

Figure 25:
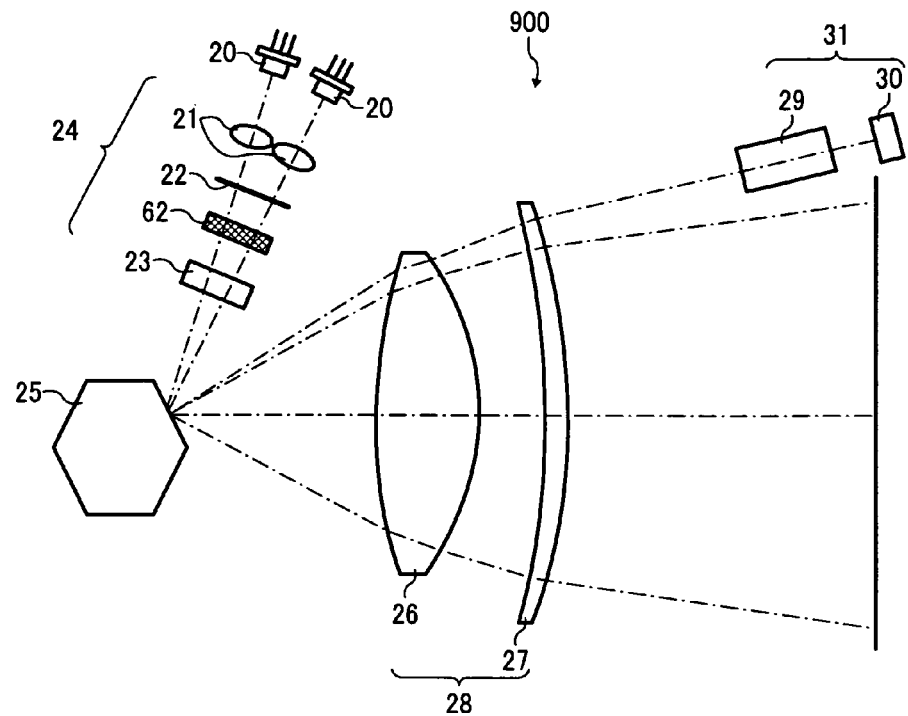
FIG. 25 is a view illustrating an example for generating a plurality of light beams as the optical scanning device 900 according to the embodiment of the present invention.

FIG. 25 is a view illustrating an example which generates a plurality of light beams as the optical scanning device 900 according to the embodiment of the present invention.

In the example illustrated in FIG. 25, the optical scanning device 900 includes two light sources 20, 20 and two coupling lenses 21, 21. Each of the light sources 20, 20 uses a semiconductor laser. Each of the coupling lenses 21, 21 shapes the light beam emitted from the light source 20, 20 into substantial parallel light.

After a part of the each light beam shaped into the substantial parallel light by the coupling lens 21, 21 is shielded by an aperture stop 22, the light beam is converged in the sub-scanning direction by a cylindrical lens 23 via a distance correcting device 62, and then is imaged in the vicinity of the deflected reflection face of the light deflector 25 as a long line image.

By the rotation of the light deflector 25, the two light beams are deflected and scanned, and then form light sports on the scanned face a by the two scanning imaging lenses 26, 27 of the scanning imaging optical system 28, respectively.

A part of the light beam toward the effective image forming area in the main-scanning direction via the scanning imaging optical system 28 enters into the light beam detecting device 31, and the position of the light beam is thereby detected by the light beam detecting device 31. In addition, the position of the distance correcting device 62 is not limited to the position illustrated in FIG. 25. The distance correcting device 62 can be arranged in any position between the light sources 20, 20 and the light deflector 25.

Figure 26:
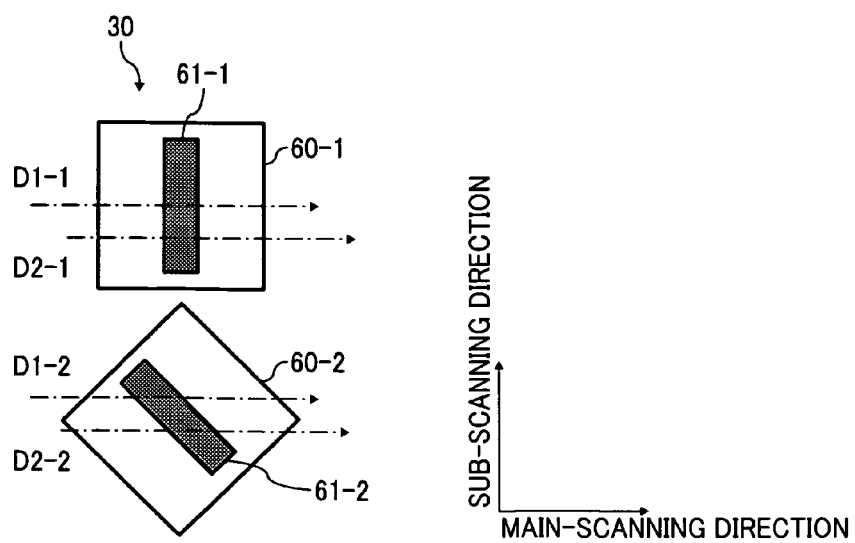
FIG. 26 is a view illustrating an example for detecting a distance between two light beams in the sub-scanning direction in light detectors 60-1, 60-2 when the two light beams generate from two light sources 20, 20 in the optical scanning device 900 according to the embodiment of the present invention.

FIG. 26 is a view illustrating an example for detecting a distance in the sub-scanning direction between the two light beams in light detectors 60-1, 60-2 when the two light beams generate from the two light sources 20, 20 in the optical scanning device 900 illustrated in FIG. 25.

If the two light beams from the light sources 20, 20 illustrated in FIG. 25 are scanned by the light deflecting device 25, and enter into the light beam detecting device 31, each of the two light beams is separated into the first order light and 0-order light penetrated and diffracted in the sub-scanning direction by the separation optical system 29.

More particularly, the first light beam in the two light beams is separated into two separation light beams D1-1, D1-2 and the second light beams in the two light beams is separated into the two separation light beams D2-1, D2-2 as illustrated in FIG. 26.

Each of the light detectors 60-1, 60-2 has a different arrangement. The $-1^{st}$ order light penetrated and diffracted is detected by the light detector 60-1 parallel to the sub-scanning direction, and the 0-order light penetrated straight is detected by the light detector 60-2 inclined in the sub-scanning direction.

Figure 27:
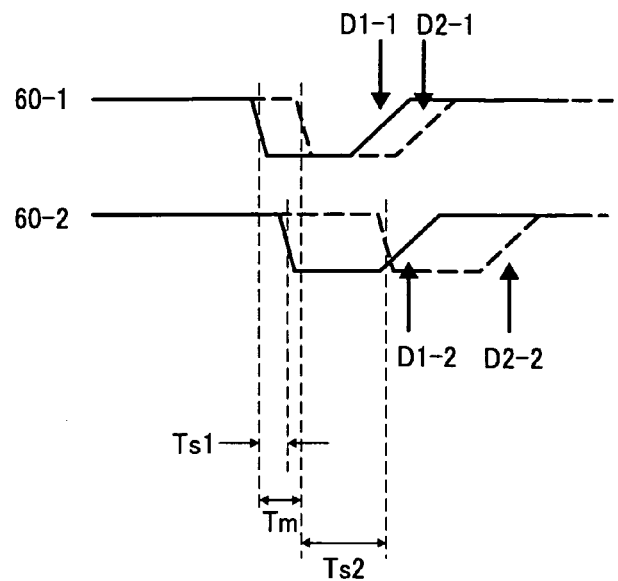
FIG. 27 is a view illustrating an example of a timing chart when the light beams are detected by the light detectors as illustrated in FIG. 26.

FIG. 27 is a timing chart when the light beams are detected by the light detectors 60-1, 60-2 illustrated in FIG. 26.

The output signal obtained from the light detector 60-1 falls when the separation light beams D1-1, D2-1 pass through the end portion on the scanning start side of the light receiving section 61-1 parallel to the sub-scanning direction. The time difference Tm illustrated in FIG. 27 corresponds to the distance in the main-scanning direction between the two light beams.

The output signal obtained from the light detector 60-2 falls when the separation light beams D1-2, D2-2 pass through the end portion on the scanning start side of the light receiving section 61-2 inclined to the light receiving section 61-1.

In this case, the time difference Ts1 between the falling of the separation light beam D1-1 and the falling of the separation light beam D1-2 corresponds to the position of the light beam in the sub-scanning direction, and the time difference Ts between the falling of the separation light beam D2-1 and the falling of the separation light beam D2-2 corresponds to the position of the light beam in the sub-scanning direction.

More particularly, the difference Ts between the time differences Ts1, Ts2 (i.e., Ts=Ts2−Ts1) corresponds to the distance in the sub-scanning direction between the first light beam and the second light beam. In this example, the output signal from the light detector 60-2 is appropriately delayed by the delay circuit.

In the optical scanning device 900 according to the embodiment of the present invention illustrated in FIGS. 25-27, the distance between light beams generated from the two light sources 20, 20 can be detected.

In the light detecting section 30 of the light beam detecting device 31, the distance between the light beams can be corrected by correcting the positions of the light beams with the distance correcting device 62 according to the distance of the light beams obtained based on the outputs of the light detectors 60-1, 60-2 illustrated in FIG. 26.

Figure 28:
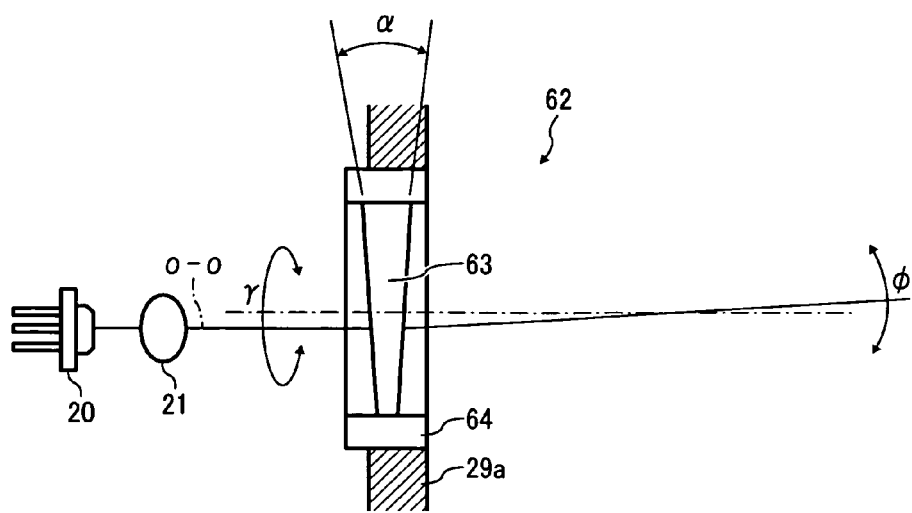
FIG. 28 is a view illustrating one example of a distance correcting device 62 illustrated in FIG. 25.

FIG. 28 is a view illustrating one example of the distance correcting device 62 illustrated in FIG. 25. In the example of FIG. 28, a cuneal prism (trapezoidal prism) 63 is used as the distance correcting device 62. The cuneal prism 63 is retained in a pedestal 64. For example, if reference number 0-0 is an optical axis of a coupling lens 21, the entering light beam can be deflected in a range of the maximum deflection angle ø by substantially rotating the cuneal prism 63 about the optical axis 0-0 in the arrow γ direction. As a result, the position of the beam spot on the scanned face a can be corrected.

More particularly, the position of the light beam can be corrected to obtain a desired distance between the light beams by controlling the cuneal prism 63 with a cuneal prism rotation device (not shown) based on the distance between the light beams detected by the light beam detecting device 31.

The optical member (cuneal prism 63) illustrated in FIG. 28 can be used as the distance correcting device 62.

The optical member in FIG. 28 corrects the position of the light beam by controlling the positional change by means of a predetermined control device, and also corrects the distance between the light beams.

The optical member (liquid crystal deflection element 51) illustrated in FIG. 22 can be used as the distance correcting device 62. In the optical member (cuneal prism 63) illustrated in FIG. 22, the position of the light beam is corrected by controlling the physical change as the liquid crystal layer by means of a predetermined control device, so as to correct the distance between the light beams.

The light beam via the scanning imaging optical system 28 as illustrated in FIG. 2 can be used as the light beam entering into the light beam detecting device 31. The light beam deflected and scanned by the light deflector 25 without passing through the scanning imaging optical system 28 can be used as the light beam entering into the light beam detecting device 31.

However, the light beam deflected and scanned by the light deflector 25 does not include the change in the position of the light beam resulting from the scanning imaging optical system 38. In addition, since the scanning imaging optical system 28 is not used, it is necessary for the separation optical system to have an imaging function of a certain level for leading the light beam deflected and scanned by the light deflector 25 to the light detecting section 30. For this reason, it is desired to use the light beam passing through the scanning imaging optical system 28 as the light entering into the light beam detecting device 31.

The light beam outside the effective image forming area or the light beam inside the effective image forming area can be used as the light beam entering into the light beam detecting device 31 as the optical scanning device 900 illustrated in FIG. 2. However, if the light beam inside the effective image forming area is used, it is necessary to stop the scanning of the effective image forming area and to shift the light beam detecting device 31 to a position capable of detecting the light beam scanning the effective image forming area. Therefore, the movement mechanism becomes complicated.

On the other hand, if the light beam outside the effective image forming area is used as the optical scanning device 900 according to the embodiment of the present invention, the position of the light beam can be detected in real time by using the light beam outside of the effective image forming area when optically scanning the effective image forming area.

As described above, the light output of the separation light beam entering into the light detecting section 30 decreases to the light beam entering into the light beam detecting device 31. When separating into the maximum two separation lights of the light output, the light output becomes ½ output of the light beam.

Therefore, if the light beam outside of the effective image forming area is used, the emission output of the light beam can be adjusted in accordance with the incident energy characteristic and sensitivity of the light detector of the light detecting section 30 only when detecting the light beam by the light beam detecting device 31. Accordingly, the detection accuracy can be improved.

The light beam detecting device 31 can be used as a synchronization detecting device for defining the writing start position in the main-scanning direction.

FIG. 29 is a view illustrating an optical scanning device in which a plurality of light beam detecting devices 31 is arranged in the main-scanning direction. FIG. 29 illustrates an example that the two light beam detecting devices 31 are disposed in the both ends outside of the effective image forming area. Of course, the two light beam detecting devices 31, 31 can be disposed inside the effective image forming area.

As described above, by disposing the light beam detecting devices 31, 31 (two devices in FIG. 29) in the main-scanning direction, the characteristics regarding the scanning line such as the inclination and the curve of the scanning line can be detected, so the highly accurate detection can be achieved. In addition, when detecting a time difference on the both ends corresponding to each color, a driving clock frequency of the light beam from the light source 20 can be adjusted, such that the effective image forming area of each color becomes the same.

According to the embodiment of the present invention, the optical scanning device 900 is used in the laser printer 100 as the image forming apparatus, but the application range of the optical scanning device of the present invention is not limited to the laser printer 100, and the optical scanning device of the present invention can be used in any image forming apparatus except the laser printer 100. If the image forming apparatus having the optical scanning image 900 is used, a high quality image can be formed at a high speed without increasing the size and the costs.

The optical scanning device of the present invention can be used in a color image forming apparatus for forming a color image. In this case, by using the optical scanning device corresponding to a color image, a high quality image can be formed at a high speed without increase the size and the costs.

Specifically, the image forming apparatus may be a tandem color apparatus corresponding to a color image and having a photoconductor drum for each of image information.

Figure 30:
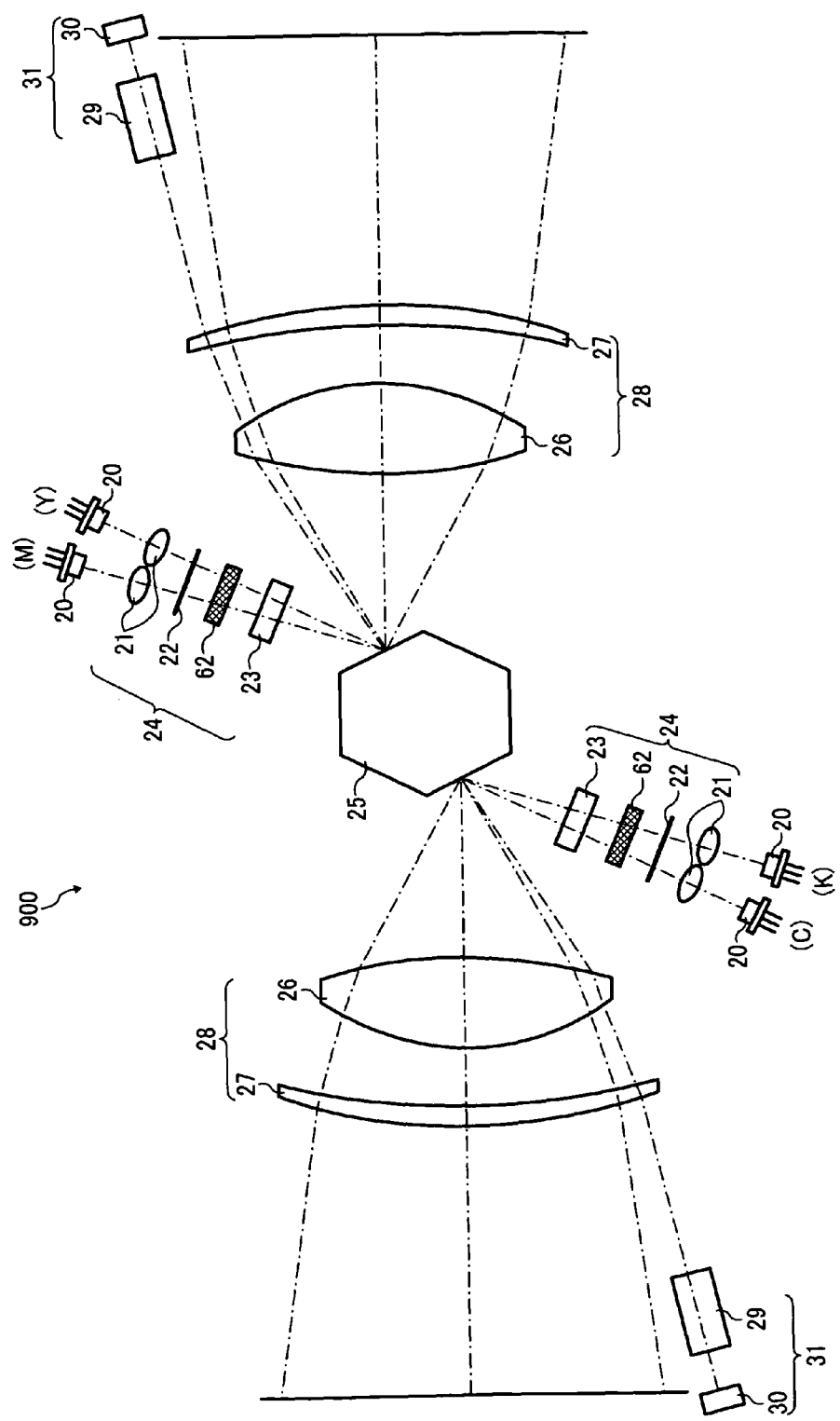
FIG. 30 is a view illustrating an optical scanning device for a tandem color device.

FIG. 30 illustrates optical scanning devices 900, 900 for a tandem color device. In FIG. 30, a total of 4 light beams scan the photoconductor drum provided for each of the colors YMCK by disposing the optical scanning devices 900 each having the two light beams as illustrated in FIG. 25 to face the common light deflector 25.

In the actual image forming apparatus, each of the light beams is led to the corresponding photoconductor drum by inserting a reflection mirror between the scanning imaging lens 26 or 27 and the scanned face a, but the reflection mirror here is omitted.

Figure 31:
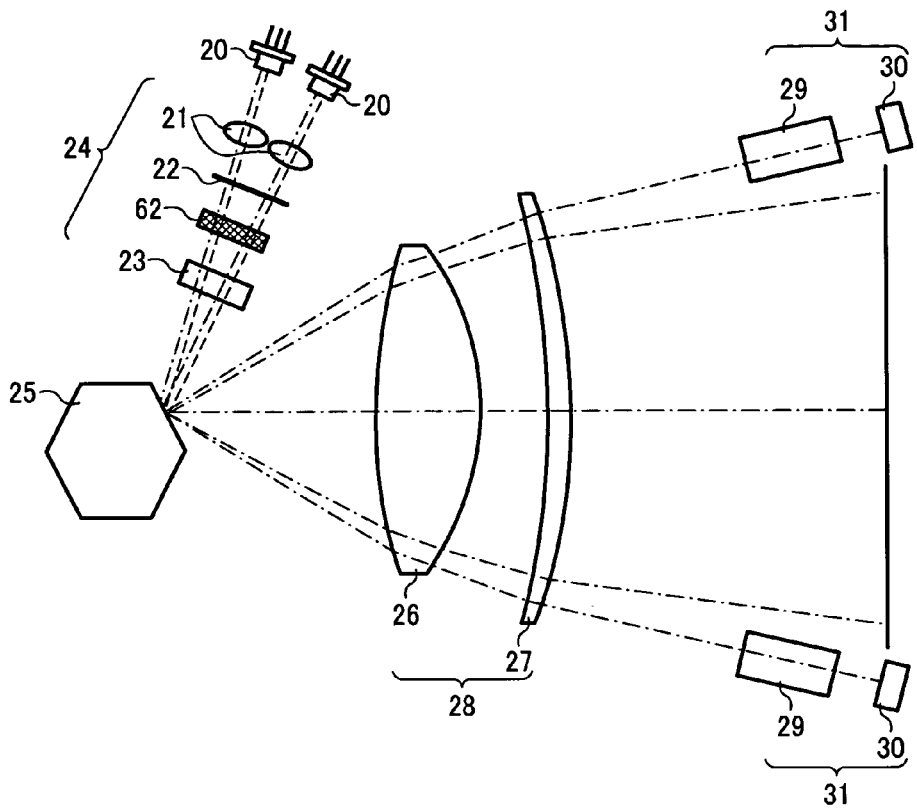
FIG. 31 is a view illustrating the optical scanning device illustrated in FIG. 29 that the light source is changed to a multi-beam light source.

FIG. 31 is an example that a multi-beam light source is used instead of the light source 20 in the optical scanning device 900 in FIG. 29. Similar to the example in FIG. 30, FIG. 31 illustrates an optical scanning device for a tandem color device that the four light beams can scan the photoconductor drum disposed for each of the colors YMCK. In the example of FIG. 31, the light beam detecting devices 31, 31 can be disposed in the both ends outside the effective image forming area.

In the optical scanning device 900 illustrated in FIG. 30, by using the multi-beam light sources each having two luminous points as substitute for the light sources 20 each having the single beam light source, a total of eight light beams can be emitted toward the light deflector 25, and each of the photoconductor drums can be scanned by the two light beams.

By using laser array light sources each having four luminous points as the light sources 20, a total of 16 light beams can be emitted toward the light deflecting device 25, and each of the photoconductors drums can be scanned by the 4 light beams. Accordingly, a high-speed image forming apparatus can be achieved.

As described above, the embodiment of the present invention illustrates the optical scanning device 900 for deflecting and scanning the light beam generated from the light source 20 by means of the light deflector 25, and for imaging on the scanned face a by means of the scanning and imaging optical system 28. The optical scanning device 900 includes the light beam detecting device 31 for detecting the position of the light beam. The light beam detecting device 31 includes the separation optical system 29 for separating the light beam into a plurality of separation light beams in the sub-scanning direction and the light detecting section 30 having a plurality of light detectors that at least one detector is disposed in a different position in the sub-scanning direction. The end portion on the side for detecting the light beam of the light receiving section of at least one light detector of the plurality of light detectors (specifically, the end portion on the scanning start side of the light receiving section 32-2, for example) is disposed at an angle to the end portions on the sides for detecting the light beams of the light receiving sections of another light detectors (specifically, the end portions on the scanning start sides of the light receiving sections 32-1, 32-3, for example).

As described above, since the plurality of light detectors 30-1-30-3 is disposed in the sub-scanning direction, the position of the light beam can be detecting without increasing the size in the main-scanning direction. In addition, it is not necessary to have a special shape for each of the light detectors 30-1-30-3, so an inexpensive light detector can be used for each of the light detectors.

Moreover, since the end portion on the side for detecting the light beam in the light receiving section 32-2 of at least one light detector 30-2 of the plurality of light detectors 30-1-30-3 is disposed at an angle to the end portion on the side for detecting the light beam (scanning start side) in the light receiving sections 32-1, 32-3 of another light detectors, the position of the light beam in the sub-scanning direction can be detected, and the distance between the light beams in the sub-scanning direction can be detected with the simple method.

In this case, if the diffracting optical element 42a-42d having the transmissive diffracting face 41 is used in the separation optical system 29 (if the transmissive diffracting face is used for separating the light beam), the separation optical system 29 can be achieved with low costs, compared with the reflection diffracting face required for a metal layer for reflection. In addition, the separation of the entering light beam and a plurality of reflected separation light beams is not required, so the layout of the optical scanning device 900 can be facilitated.

If the diffracting optical element 42a is the diffracting optical element 43a-43d having a frequency structure in the sub-scanning direction as the transmissive diffracting face 41, the light beam can be separated into the separation light beams only in the sub-scanning direction in accordance with the lattice equation. Therefore, the light beam detecting device 31 which can not generate the loss of the light volume for separating except the sub-scanning direction can be achieved.

If the transmissive diffracting face has the phase modulation type, the transmissive diffracting face of the phase modulation type modulates the phase, but does not change the amplitude. Therefore, the light beam detecting device 31 which does not generate the light volume loss on the transmissive diffracting face can be achieved.

In addition, when the light beam is separated into the two separation light beams by means of the separation optical system 29, the light volume entering into the light detectors 34-1, 34-2 can be improved up to 50%.

Specifically, the separation optical system 29 includes the diffracting optical element 33 including the transmissive diffracting face 33a having the frequency structure in the sub-scanning direction. If the angle between the light beam entering into the diffracting optical element 33 and the normal line of the transmissive diffracting face 33a is $\alpha$, the refraction index of the diffracting optical element 33 is N, the frequency of the frequency structure is $\Lambda$, and the wavelength of the light beam is $\lambda$, the frequency $\Lambda$ of the frequency structure of the transmissive diffracting face 33a satisfies $\lambda/(\sin \alpha + N \cos \alpha) < \Lambda < \min\{\lambda/(N-\sin \alpha), 2\lambda/(N+\sin \alpha), \lambda/\sin \alpha\}$. Therefore, with a condition which can dispose the light detector, the transmissive diffracting face for only separating the light beam into the 0-order light and the $-1^{st}$ order light can be obtained. Accordingly, the light volume loss can be reduced.

In case that the diffracting optical element 33 has the flat plane on the side opposite to the transmissive diffracting face, if the frequency $\Lambda$ of the frequency structure of the transmissive diffracting face satisfies $\lambda/(\sin \alpha + \cos \alpha) < \Lambda < \min\{\lambda/(1-\sin \alpha), 2\lambda/(1+\sin \alpha), \lambda/\sin \alpha\}$, in the diffracting optical element 33 having the transmissive diffracting face and the flat plane, the $-1^{st}$ order light on the transmissive diffracting face can be lead to the light detector without total reflecting on the flat plane.

In the optical scanning device 900 according to the embodiment of the present invention, by using the plurality of light detectors 30-1-30-3, 34-1, 34-2, 36-1-36-3 each having the same shape and the structure, the characteristic of each of the light detectors can be uniformed. Therefore, the handling for establishing the detection accuracy and the control circuit is facilitated, and the stable detection can be achieved.

In the optical scanning device 900 according to the embodiment of the present invention, at least one light detector 30-1, 34-1, 36-1 of the light detectors is disposed such that the end portion on the side for detecting the light beam in the light receiving section is arranged in parallel to the sub-scanning direction. Therefore, the output signal (time) by the position of the light beam in the sub-scanning direction does not change, so the output signal can be used as the reference signal. The light detector can be used as the light detector for detecting synchronization.

In the optical scanning device 900, each of the light detectors 30-1, 34-1, 36-1 and the like in which the end portion on the side for detecting the light beam is arranged in parallel to the sub-scanning direction is used for detecting the diffracted separation light beam which is not the 0-order transmission. Therefore, the light beam strong for the change in the environment can be detected without having influence of the change in the wavelength. More particularly, the diffracted separation light beam causes change in the diffraction angle to change in the wavelength of the entering light beam, so the light beam detection strong for the change in an environment can be conducted without having influence of the change in the wavelength by detecting the separation light beam diffracted by the light detectors 30-1, 34-1, 36-1 and the like that the end portions for detecting the light beams are disposed in parallel to the sub-scanning direction.

In the optical scanning device 900 according to the embodiment of the present invention, the two light detectors, which are the minimum number of the light detector, can be used for detecting the position of the light beam in the sub-scanning direction.

In addition, according to the present invention, it is possible to provide the optical scanning device 900 for the image forming apparatus corresponding to colorization and high resolution when detecting the position of the light beam in the sub-scanning direction by means of the light beam detecting device 31. Moreover, by using the light beam detecting device using the light detectors each having a different arrangement, the position of the light beam in the sub-scanning direction can be detected, and also the optical scanning device for the image forming device corresponding to the colorization and the high resolution can be provided.

The optical scanning device 900 includes the position correcting device 50 for correcting the position of the light beam according to the position of the light beam detected by the light beam detecting device 31 in the sub-scanning direction. Especially, the writing position and the color shift can be corrected by conducting the feedback operation by means of the position correcting device 50. Therefore, the optical scanning device 900 for the image forming apparatus corresponding to the high resolution and colorization can be provided.

In the optical scanning device 900, when the position correcting device 50 includes at least one optical member 58, 59 disposed in the optical path from the light source 20 to the scanned face a and the control mechanism for controlling the positional change and the physical change in the optical member, the position of the light beam can be corrected by arranging the control mechanism for controlling the positional change in the passive optical member and the physical change in the active optical member.

According to the present invention, the optical scanning device 900 for the image forming apparatus corresponding to the high resolution and the colorization can be prevented when the light beam detecting device 31 detects the distance of the light beams emitted from the light source 20. More particular, by using the light detecting device using the light detectors 60-1, 60-2 each having a different arrangement, especially, the distance between the light beams in the sub-scanning direction can be detected, and the optical scanning device for the image forming apparatus corresponding to the high resolution and high speed can be provided.

When the optical scanning device 900 includes the distance correcting device 62 for correcting the distance between the light beams based on the distance between the light beams detected by the light beam detecting device 31, especially, the scanning line pitches can be corrected by conducting the feedback control by means of the distance correcting device 62. Therefore, the optical scanning device for the image forming apparatus corresponding to the high resolution and the high speed can be provided.

In the optical scanning device 900, when the distance correcting device 62 includes at least one optical member 63 disposed in the optical path from the light source to the light deflecting device and the control mechanism for controlling the positional change and the physical change in the optical member, the position of the light beam can be corrected by disposing the control mechanism for controlling the positional change of the passive optical member and the physical change of the active optical member. By arranging the distance correcting device 62 in front of the light deflector 25, the small optical member 63 can be used as the distance correcting device 62.

In the optical scanning device 900 according to the present invention, when the light beam, which has passed through the scanning imaging optical system 28, enters into the light beam detecting device 31, the position of the light beam actually generating in the effective image forming area can be detected by including the position of the light beam resulting from the scanning imaging optical system 28.

Moreover, by using the scanning imaging optical system 28, the separation optical system 29 of the light beam detecting device 31 is only required to have a separation effect, so the structure of the optical scanning device 900 can be facilitated.

In the optical scanning device 900 according to the present invention, when the light beam outside the effective image forming area enters into the light beam detecting device 31, the position of the light beam can be detected with a real time, and the feed back control can be conducted with high accuracy. In addition, the down time of the image forming apparatus required for the detection becomes unnecessary.

In the optical scanning device 900, only when detecting the light beam by means of the light beam detecting device 31, the output of the light beam can be adjusted. In this case, the emission output of the light beam can be adjusted to meet the characteristic of the incident energy and the sensitivity of the light detector, without having influence of the effective image forming area. Accordingly, the detection accuracy can be improved.

In the optical scanning device 900 according to the embodiment of the present invention, when a plurality of light beam detecting devices 31 is disposed in the main-scanning direction, the characteristics regarding the scanning lines such as the inclination of the scanning line and the curve of the scanning line can be detected, so the detection can be conducted with high accuracy. In addition, by disposing the correction device, the image forming apparatus having high resolution can be provided by the feedback control.

Moreover, in order to uniform the effective image area width of each color, the magnification error of the entire width can be reduced by adjusting the driving clock frequency of the light beam from the light source 20.

In the optical scanning device 900 according to the embodiment of the present invention, by providing the synchronization detecting device for defining the writing start position in the main-scanning direction in the light beam detecting device 31, the detection device can be integrated, so the size of the optical scanning device is reduced and the costs of the optical scanning device is decreased.

The image forming apparatus in which the optical scanning device 900 according to the embodiment of the present invention is used can achieve high resolution and high speed, and can correspond to colorization.

The present invention is applicable for a digital copying machine, a printer, a FAX, a digital complex machine (a complex machine such as a copying machine, a FAX, a printer and a scanner), and a measuring equipment.

Although the present invention has been described in terms of exemplary embodiments, it is not limited thereto. It should be appreciated that variations may be made in the embodiments described by person skilled in the art without departing from the scope of the present invention as defined by the following claims.

What is claimed is:
1. An optical scanning device, comprising:
a light source;
a light deflector for deflecting and scanning a light beam from the light source;
a scanning imaging optical system for imaging the light beam via the light deflector onto a scanned face;
a light beam detecting device for detecting a position of the light beam;
a separation optical system provided in the light beam detecting device for separating the light beam into a plurality of separation light beams in a sub-scanning direction;
a plurality of light detectors provided in the light beam detecting device to be disposed in different positions in the sub-scanning direction, each of the light detectors detecting a separation light beam; and
a plurality of light receiving sections separated in the sub-scanning direction and provided in the light detectors, respectively, wherein an inclination of one side of the light receiving section that the light beam cuts across in at least one of the plurality of light detectors relative to the sub-scanning direction is different from an inclination of one side of the light receiving section that the light beam cuts across in the other light detector relative to the sub-scanning direction; and wherein the plurality of light detectors has the same shape and the same structure, the one side of the light receiving section of the other light detector is disposed parallel to the sub-scanning direction, and at least one light detector is tilted to the sub-scanning direction such that the one side of the light receiving section has a predetermined angle to the one side of the light receiving section of the other light detector.

2. The optical scanning device according to claim 1, wherein the separation optical system includes an optical element having a transmissive diffracting face.

3. The optical scanning device according to claim 2, wherein the optical element has a diffracting optical element having a frequency structure in the sub-scanning direction as the transmissive diffracting face.

4. The optical scanning device according to claim 3, wherein the transmissive diffracting face is a phase modulation type.

5. The optical scanning device according to claim 1, wherein the light beam detecting device includes two light detectors, and the light beam is separated into two separation light beams by the separation optical system.

6. The optical scanning device according to claim 1, wherein at least one of the plurality of light detectors, with the one side of the light receiving section is disposed parallel to the sub-scanning direction, is used for detecting the diffracted separation light beam which is not 0-order transmission.

7. The optical scanning device according to claim 1, wherein the light beam detecting device detects the position of the light beam in the sub-scanning direction.

8. The optical scanning device according to claim 7, further comprising a position correcting device for correcting the position of the light beam according to the position of the light beam in the sub-scanning direction detected by the light beam detecting device.

9. The optical scanning device according to claim 8, wherein the position correcting device includes at least one optical member disposed in an optical path from the light source to the scanned face and a control mechanism for controlling positional change and physical change of the optical member.

10. The optical scanning device according to claim 1, wherein the light source generates a plurality of light beams and the light beam detecting device detects a distance between the light beams.

11. The optical scanning device according to claim 10, further comprising a distance correcting device for correcting a distance between the light beams from the light source according to the distance of the light beams detected by the light beam detecting device.

12. The optical scanning device according to claim 11, wherein the distance correcting device includes at least one optical member disposed in an optical path from the light source to the light deflector and a control mechanism for controlling positional change and physical change of the optical member.

13. The optical scanning device according to claim 1, wherein the light beam via the scanning imaging optical system enters into the light beam detecting device.

14. The optical scanning device according to claim 1, wherein the light beam detecting device is disposed such that the light beam outside an effective image forming area on the scanned face enters.

15. The optical scanning device according to claim 14, further comprising a control device for adjusting output of the light beam only when detecting the light beam by the light beam detecting device.

16. The optical scanning device according to claim 1, wherein a plurality of light beam detecting devices is disposed in the main-scanning direction.

17. The optical scanning device according to claim 1, wherein the light beam detecting device includes a synchronization detecting device for defining a writing start position in the main-scanning direction.

18. The optical scanning device according to claim 1, wherein the light receiving section of the plurality of light detectors has a rectangular shape, and an inclination of a long side of the rectangular light receiving section of at least one of the light detectors relative to the sub-scanning direction is different from an inclination of a long side of the rectangular light receiving section of the other light detector relative to the sub-scanning direction.

19. An optical scanning device, comprising:
a light source;
a light deflector for deflecting and scanning a light beam from the light source;
a scanning imaging optical system for imaging the light beam via the light deflector onto a scanned face;
a light beam detecting device for detecting a position of the light beam;
a separation optical system provided in the light beam detecting device for separating the light beam into a plurality of separation light beams in a sub-scanning direction;
a plurality of light detectors provided in the light beam detecting device to be disposed in different positions in the sub-scanning direction, each of the light detectors detecting the separation light beam; and
a plurality of light receiving sections each having an end portion, the light receiving sections provided in the light detectors, respectively, at least one light receiving section provided in the light detector being disposed such that the end portion on a side for detecting the separation light beam has a predetermined angle to the end portion of the other light detector,
wherein the light beam detecting device includes two light detectors, and the light beam is separated into two separation light beams by the separation optical system, and
wherein the separation optical system includes a diffracting optical element including a transmissive diffracting face having a frequency structure in the sub-scanning direction, when an angle between the light beam entering into the diffractive optical element and a normal line of the transmissive diffracting face is $\alpha$, a reflective index of the diffractive optical element is N, a frequency of the frequency structure is $\Lambda$, and a wavelength of the light beam is $\lambda$, the frequency of the frequency structure of the transmissive diffracting face $\Lambda$ satisfies $\lambda/(\sin \alpha + N \cos \alpha) < \Lambda < \min \{\lambda/(N-\sin \alpha), 2\lambda/(N+\sin \alpha), \lambda/\sin \alpha\}$.

20. The optical scanning device according to claim 19, wherein the diffractive optical element has a flat plane on a side opposite to the transmissive diffracting face, and the frequency of the frequency structure of the transmissive diffracting face $\Lambda$ satisfies $\lambda/(\sin \alpha + \cos \alpha) < \Lambda < \min \{\lambda/(1-\sin \alpha), 2\lambda/(1+\sin \alpha), \lambda/\sin \alpha\}$.

* * * * *